US011303392B2

United States Patent
Sun et al.

(10) Patent No.: US 11,303,392 B2
(45) Date of Patent: Apr. 12, 2022

(54) MULTI-HARQ METHODS AND APPARATUS FOR CODEBLOCK GROUP BASED TRANSMISSIONS

(71) Applicant: QUALCOMM Incorporated, San Diego, CA (US)

(72) Inventors: Jing Sun, San Diego, CA (US); Seyedkianoush Hosseini, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 15/919,157

(22) Filed: Mar. 12, 2018

(65) Prior Publication Data

US 2018/0270022 A1    Sep. 20, 2018

Related U.S. Application Data

(60) Provisional application No. 62/472,483, filed on Mar. 16, 2017.

(51) Int. Cl.
*H04L 1/18* (2006.01)
*H04L 1/16* (2006.01)
(Continued)

(52) U.S. Cl.
CPC .......... *H04L 1/1819* (2013.01); *H04L 1/0061* (2013.01); *H04L 1/1614* (2013.01);
(Continued)

(58) Field of Classification Search
CPC ... H04L 1/1819; H04L 1/1896; H04L 1/1893; H04L 1/0061; H04L 1/1887; H04L 1/1614; H04B 7/0417
See application file for complete search history.

(56) References Cited

U.S. PATENT DOCUMENTS 8,539,298 B2    9/2013   Shimanuki et al.
9,461,720 B2   10/2016   Nammi et al.
(Continued)

FOREIGN PATENT DOCUMENTS

CN    101621364 A    1/2010
CN    102318254 A    1/2012
(Continued)

OTHER PUBLICATIONS

CMCC: "Discussion on eMBB/URLLC Multiplexing", 3GPP Draft; R1-1703409, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), 3 Pages, XP051210537, Retrieved from the Internet: URL: http://www.3gpp.org/ftp/Meetings_3GPP_SYNC/RAN1/Docs/ [retrieved on Feb. 12, 2017].

(Continued)

*Primary Examiner* — Cynthia Britt
*Assistant Examiner* — Dipakkumar B Gandhi
(74) *Attorney, Agent, or Firm* — Arent Fox LLP

(57)    ABSTRACT

In an aspect of the disclosure an apparatus, e.g., a base station, maybe configured to receive, from a UE, ACK/NACK feedback indicating that a subset of CBGs of a set of transmitted CBGs failed to be properly decoded. The apparatus maybe further configured to retransmit the subset of CBGs based on the ACK/NACK feedback and transmit information indicating the CBGs being retransmitted. In one configuration, a TB of new data maybe transmitted with the retransmitted subset of CBGs in a subframe/slot. In an aspect, a UE may be configured to determine that one or more CBGs of a received set of CBGs failed to be properly decoded at the UE, and send ACK/NACK feedback indicating the one or more CBGs that failed to be decoded. The (Continued)

UE maybe further configured to receive a retransmission of CBGs in the set of CBGs, and information indicating the retransmitted CBGs.

22 Claims, 13 Drawing Sheets

(51) Int. Cl.
  *H04L 1/00* (2006.01)
  *H04L 1/22* (2006.01)
  *H04B 7/0417* (2017.01)

(52) U.S. Cl.
  CPC .......... *H04L 1/1887* (2013.01); *H04L 1/1893* (2013.01); *H04L 1/1896* (2013.01); *H04B 7/0417* (2013.01)

(56) References Cited

U.S. PATENT DOCUMENTS

| | | | |
|---|---|---|---|
| 9,516,609 B2 | 12/2016 | Sambhwani et al. | |
| 2002/0150040 A1 | 10/2002 | Tong et al. | |
| 2004/0153909 A1* | 8/2004 | Lim | H04L 1/1671 714/714 |
| 2007/0061664 A1* | 3/2007 | Pan | H04L 1/1867 714/748 |
| 2009/0249155 A1* | 10/2009 | Mayrench | H04L 1/0053 714/748 |
| 2009/0313516 A1* | 12/2009 | Shin | H04L 1/0003 714/748 |
| 2011/0116530 A1* | 5/2011 | Sambhwani | H04L 1/1607 375/145 |
| 2013/0176981 A1* | 7/2013 | Earnshaw | H04W 72/04 370/329 |
| 2013/0336300 A1* | 12/2013 | Choi | H04L 1/1861 370/336 |
| 2014/0044060 A1* | 2/2014 | Nammi | H04B 7/0417 370/329 |
| 2014/0053049 A1* | 2/2014 | Chen | H04L 1/0066 714/807 |
| 2014/0126551 A1* | 5/2014 | Nammi | H04L 1/1812 370/336 |
| 2014/0133471 A1* | 5/2014 | Nammi | H04L 1/06 370/336 |
| 2014/0241311 A1* | 8/2014 | Berggren | H04L 1/1614 370/330 |
| 2015/0009952 A1* | 1/2015 | Berggren | H04L 5/0044 370/330 |
| 2015/0067435 A1* | 3/2015 | Yerramalli | H04L 1/0071 714/748 |
| 2015/0195070 A1* | 7/2015 | Kim | H04L 5/0091 370/329 |
| 2017/0079065 A1* | 3/2017 | Lyu | H04W 72/1289 |
| 2019/0020444 A1* | 1/2019 | Froberg Olsson | H04L 1/1819 |
| 2019/0181986 A1* | 6/2019 | Kitamura | H04L 1/1819 |

FOREIGN PATENT DOCUMENTS

| | | |
|---|---|---|
| CN | 102362459 A | 2/2012 |
| CN | 104584474 A | 4/2015 |
| JP | 2012165391 A | 8/2012 |
| WO | 2016105173 A1 | 6/2016 |
| WO | 2017003048 A1 | 1/2017 |

OTHER PUBLICATIONS

LG Electronics: "On DCI Contents for NR", 3GPP Draft; R1-1700495 on DCI Contents for NR, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017 (Jan. 16, 2017), 4 Pages, XP051208026, Retrieved from the Internet: URL: http://www.3gpp.org/ftp/Meetings_3GPP_SYNC/RAN1/Docs/ [retrieved on Jan. 16, 2017].
Partial International Search Report—PCT/US2018/022241—ISA/EPO—dated Jun. 7, 2018.
Samsung: "CB-Group Based Retransmission for eMBB", 3GPP Draft; R1-1702990—CBG-Based Retransmission for EMBB. 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 13, 2017), XP051210132, 9 pages, Retrieved from the Internet: URL: http://www.3gpp.org/ftp/Meetings_3GPP_SYNC/RAN1/Docs/ [retrieved on Feb. 12, 2017].
International Search Report and Written Opinion—PCT/US2018/022241—ISA/EPO—dated Aug. 6, 2018.
Mediatek Inc: "On Multiple HARQ Bits per TB and Feedback Mechanism", 3GPP TSG RAN WG1 Meeting #88, 3GPP Draft; R1-1702738 On Multiple HARQ Bits per TB and Feedback Mechanism_Final, 3rd Generation Partnership Project (3gpp), Mobile Competence Centre; 650, Route Des Lucioles; F-06921 Sophia-Antipolis, vol. RAN WG1, No. Athens, Greece; Feb. 13, 2017-Feb. 17, 2017, Feb. 12, 2017 (Feb. 12, 2017), 4 Pages, XP051209885, Retrieved from the Internet: URL: http://www.3gpp.org/ftp/Meetings_3GPP_SYNC/RAN1/Docs/ [retrieved on Feb. 12, 2017] section 3.
Mediatek Inc: "URLLC and eMBB DL Multiplexing Using CRC", 3GPP TSG RAN WG1 Meeting #87, 3GPP Draft, R1-1612149 URLLC and EMBB Multiplexing Using CRC—Final, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 14, 2016-Nov. 18, 2016, Nov. 13, 2016 (Nov. 13, 2016), XP051176101, Retrieved from the Internet: URL: http://www.3gpp.org/ftp/Meetings_3GPP_SYNC/RAN1/Docs/ [retrieved on Nov. 13, 2016], Chapter 2.2, 6 pages.
Mediatek Inc: "URLLC and eMBB DL Multiplexing Using CRC Masking and Multi-Bit NACK Feedback", 3GPP TSG RAN WG1 NR Ad-Hoc Meeting, 3GPP Draft, 3GPP TSG RAN WG1 Meeting #88, R1-1702745, URLLC and EMBB DL Multiplexing Using CRC Masking and Multi Bit NACK Feeds Ack, 3rd Generation Partnership-Project (3GPP), Mobile Competence Centre, 650, Route Des Lucioles, vol. RAN WG1, No. Athens, Feb. 13, 2017-Feb. 17, 2017, Feb. 12, 2017 (Feb. 12, 2017), 6 Pages, XP051209892, [retrieved on Feb. 12, 2017], Chapter 2.2.
Qualcomm Incorporated: "Multi-Bit HARQ-ACK Feedback", 3GPP TSG-RAN WG1 #88, 3GPP Draft; R1-1702636 Multi-Bit HARQ-ACK Feedback, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017], 9 Pages, Feb. 7, 2017 (Feb. 7, 2017), XP051221491, Retrieved from the Internet: URL: http://www.3gpp.org/ftp/tsg_ran/WG1_RL1/TSGR1_88/Docs/ [retrieved on Feb. 7, 2017].

* cited by examiner

MULTI-HARQ METHODS AND APPARATUS FOR CODEBLOCK GROUP BASED TRANSMISSIONS

CROSS-REFERENCE TO RELATED APPLICATION(S)

This application claims the benefit of U.S. Provisional Application Ser. No. 62/472,483 entitled MULTI-HARQ METHODS AND APPARATUS FOR CODEBLOCK GROUP BASED TRANSMISSIONS filed on Mar. 16, 2017, which is expressly incorporated by reference herein in its entirety.

BACKGROUND

Field

The present disclosure relates generally to communication systems, and more particularly, to methods and apparatus that support codeblock group (CBG) retransmissions along with transmission of additional data.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus, e.g., a base station, may be configured to receive, from a user equipment (UE), acknowledgement (ACK)/negative ACK (NACK) (ACK/NACK) feedback indicating that a subset of CBGs of a set of transmitted CBGs failed to be properly decoded. The apparatus may be further configured to retransmit, based on the ACK/NACK feedback, the subset of CBGs. The apparatus may be further configured to transmit information indicating the subset of CBGs that is being retransmitted. In some configurations, the subset of CBGs is retransmitted in a subframe along with additional new data.

In an aspect of the disclosure, a method, a computer-readable medium, and an apparatus are provided. The apparatus, e.g., a UE, may be configured to determine that one or more CBGs of a set of CBGs received from a base station failed to be properly decoded at the UE. The apparatus may be further configured to send, to the base station, ACK/NACK feedback indicating the one or more that CBGs failed to be properly decoded. The apparatus may be further configured to receive, from the base station, a retransmission of CBGs in the set of CBGs in response to the ACK/NACK feed, and information indicating the CBGs in the set of CBGs that are being retransmitted.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
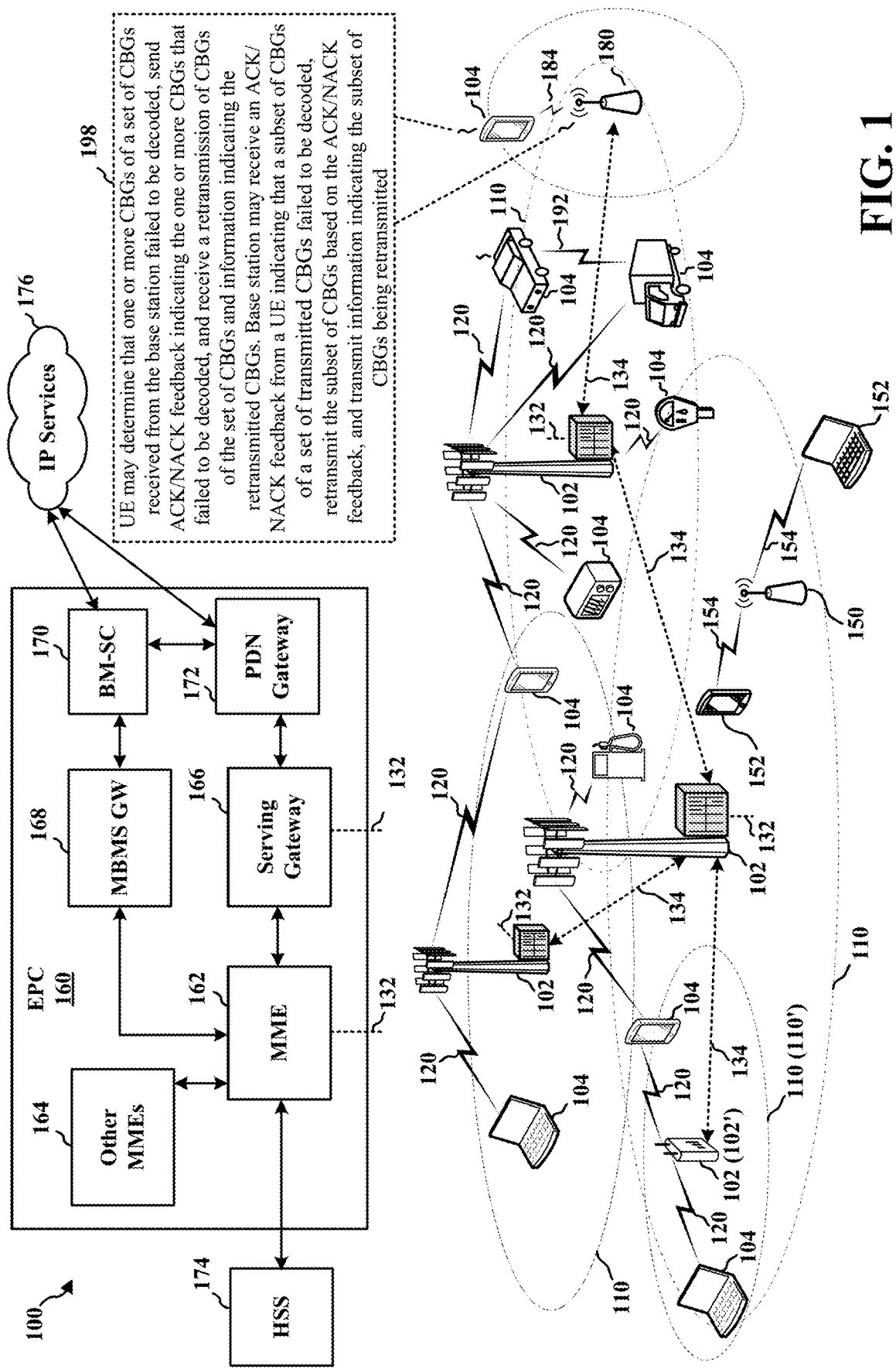
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology without loss of generality. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine that one or more codeblock groups (CBGs) of a set of CBGs received from a base station (e.g., base station 180/102) failed to be properly decoded at the UE, send to the base station, ACK/NACK feedback indicating the one or more CBGs that failed to be properly decoded, and receive a retransmission of CBGs of the set of CBGs from the base station and information indicating the retransmitted CBGs of the set of CBGs (198). The base station 180/102 may be configured to receive, from the UE 104, the ACK/NACK feedback indicating that a subset of CBGs (e.g., the one or more CBGs) failed to be properly decoded, determine which CBGs to retransmit based on the ACK/NACK feedback, retransmit the CBGs determined based on the ACK/NACK feedback, and transmit information indicating which CBGs are being retransmitted (198). In a particular example, each CBG of the set of CBGs received from the base station 180/102 may represent a portion of a larger transport block (TB), and the UE 104 may provide a CBG-level feedback, such as a bitmap or other suitable representation, of the particular CBGs of the TB which failed to decode. Based upon the feedback received, the base station 180/102 may determine which CBGs are needed and may send the CBGs to the UE 104 in a retransmission with portions of a new TB. The CBG-level retransmission and the portions of the new TB may occur in the same slot (of a subframe) while being managed under different HARQ process identifiers. The UE 104 may then determine which portions of the retransmission represent the retransmitted CBGs, verify that the failed CBGs have been properly received, decode the retransmitted CBGs and portions of the new TB, and continue with CBG-level feedback until decoding succeeds or the process is terminated. The techniques disclosed herein support low latency operations and the efficient use of air link resources.

Figure 2:
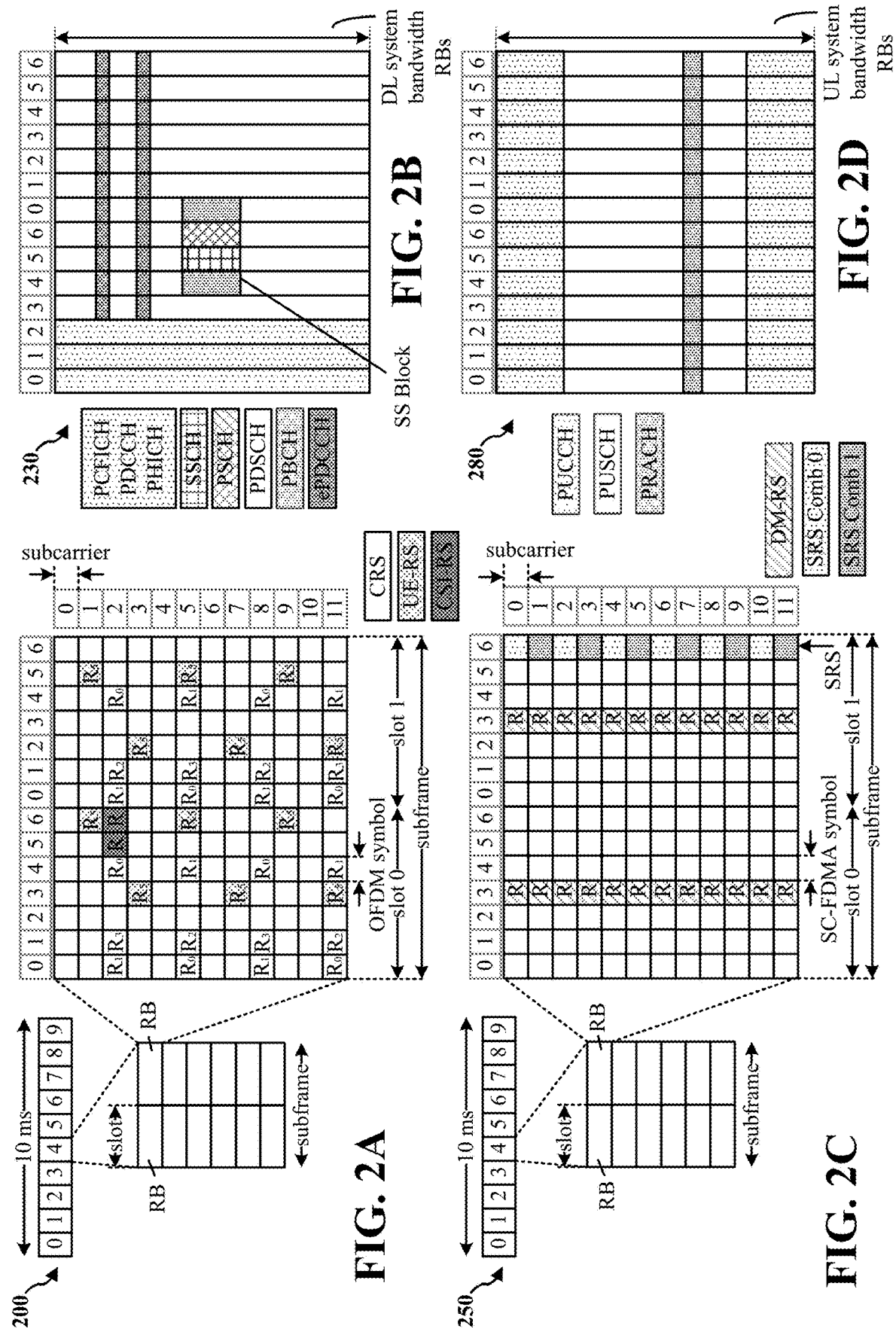
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
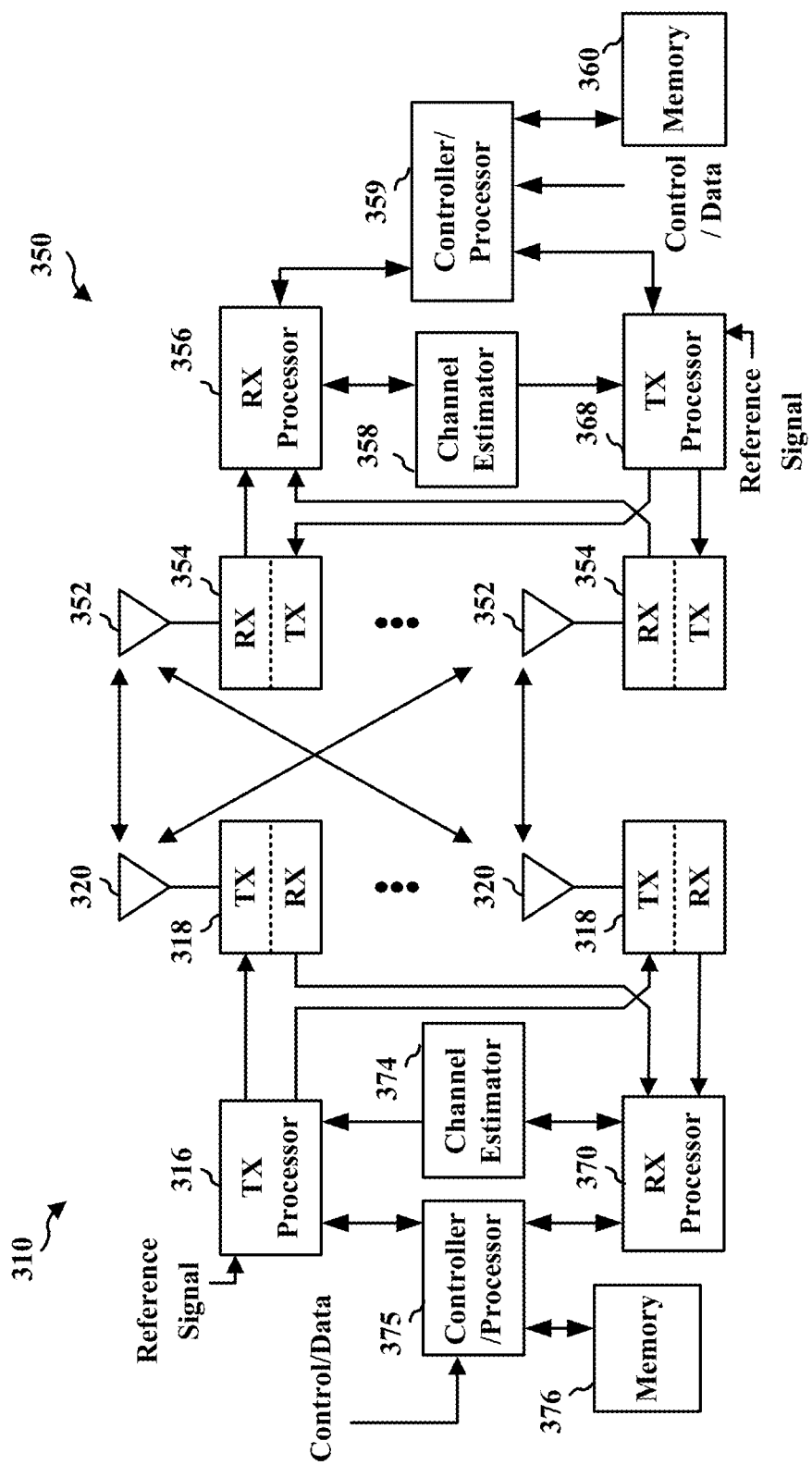
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As described herein, controller/processor 359/375 supports HARQ operation at the CBG-level in which a device requests retransmission of a partial TB, e.g., one or more CBGs of a TB, and through which new data and retransmitted CBGs may form part of a same resource allocation.

LTE and NR systems supports many diverse applications that have stringent latency and/or reliability requirements such as the URLLC, and others such as the eMBB. URLLC and eMBB communications are transmitted based on different transmission durations. For example, eMBB transmissions may have longer duration, e.g., with slot based transmission, and URLLC transmissions may have shorter duration, e.g., with mini-slot based transmissions. In NR systems, for example, dynamic resource sharing between URLLC and eMBB may be supported, e.g., with an indicator channel. For example, a resource occupied by an ongoing eMBB communication may be punctured/preempted for a URLLC type transmission. In such a scenario, a device, e.g., a base station, may provide an indication of URLLC preemption/puncture to a UE which may be expecting eMBB type data on the punctured/preempted eMBB resource(s) regarding the impacted eMBB resource to facilitate the UE's demodulating and decoding of the current transmission and subsequent (re)-transmissions of the impacted eMBB data. With CBG level ACK/NACK feedback, the UE may indicate to the base station a failure to decode one or more transmitted CBGs and/or codeblocks (CBs). The approach is more flexible than pure TB-level feedback, enables a more efficient use of resources, and potentially reduces latency associated with the transmission and processing of duplicative information. For instance, user data and/or system information carried by a PDSCH may be coded in a set of CBs that may represent a TB. The PDSCH CBs in the TB may be collected/grouped into CBGs. Via the CBG level ACK/NACK feedback, the UE may indicate to the base station which of one or more CBGs have not been properly decoded, e.g., due to the impact of resource puncturing, noise and/or channel interference etc. In many such scenarios, CBG level ACK/NACK feedback may facilitate efficient recovery, by the UE, of CBs and/or CBGs failed in previous transmissions.

Figure 4:
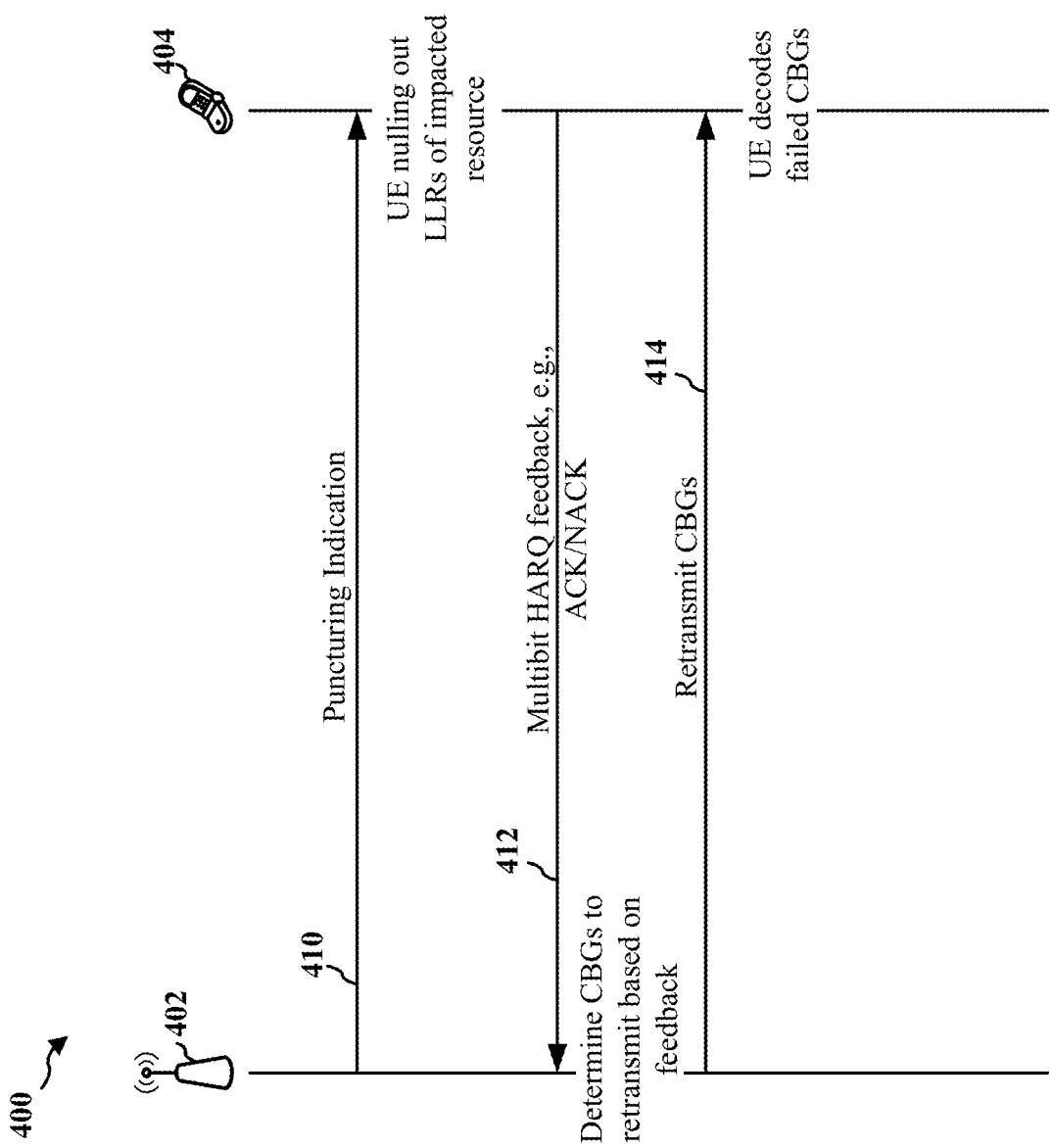
FIG. 4 illustrates signaling exchange between a base station and a UE in a communication system where dynamic resource sharing between Ultra-Reliable and Low-Latency Communications (URLLC) and Enhanced Mobile Broadband (eMBB) communications may be supported.

FIG. 4 is a drawing 400 illustrating signaling exchange between a base station 402 and a UE 404 in a communication system that supports dynamic resource sharing between URLLC and eMBB. As illustrated, there may be several rounds of handshake between the base station 402 and the UE 404, e.g., when dynamic resource sharing between URLLC and eMBB type communication occurs and a eMBB resource is punctured/preempted for a URLLC type transmission. For example, consider that the base station 402 needs to send URLLC data while an eMBB communication is ongoing. As dynamic resource sharing between URLLC and eMBB is supported, the base station 402 may puncture/preempt one or more resources (e.g., time-frequency resources) on which eMBB data is coded, e.g., resources for CBGs corresponding to the eMBB communication. In an aspect, the base station 402 may send a puncturing/preemption indication (e.g., a URLLC indication) 410 to the UE 404 indicating the impacted/affected eMBB resources due to the resource puncturing, e.g., for URLLC data. Providing such a puncturing indication facilitates demodulating and decoding of a current transmission and subsequent (re)-transmission of the eMBB data, e.g., CBGs corresponding to the eMBB data, that was replaced by the URLLC data in the current transmission. Upon receiving the puncturing indication 410, the UE 404 may determine that CBGs corresponding to the expected eMBB data on the indicated punctured eMBB resources may be corrupted and may not be decoded. While the UE may decode CBGs corresponding to the eMBB data on the non-impacted resources, the UE 404 may fail to properly decode CBGs on the impacted, e.g., punctured, eMBB resources. Thus the UE may null out the log-likelihood ratios (LLRs) corresponding to the data received on the impacted resources. Next, the UE 404 may send a multibit HARQ feedback, e.g., a multibit ACK/NACK feedback to the base station 402 indicating the CBGs which the UE failed to decode thereby allowing the base station 402 to determine which CBGs need to be retransmitted. Next, assuming that the base station 402 properly decodes the ACK/NACK feedback to determine which CBGs need to be retransmitted, the base station 402 may retransmit (414) the CBGs, which the UE 404 failed to decode in the previous transmission, to the UE 404. The UE 404 may receive and decode the CBGs after successful reception.

While the retransmission mechanism facilitates recovery of CBs/CBGs which failed decoding in the previous transmission, it is noted that CBG retransmission may be limited to one TB per HARQ process. However, such a constraint on retransmission may lead to inefficient use of the resources in the retransmission slot and low throughput. While the retransmission of failed CBGs may occupy only a portion of available resources of a subframe slot being used for retransmission, many resources of the slot remain unoccupied. Since the retransmission may only allow retransmission of failed CBGs and not new or additional data, the throughput may be significantly affected due to wastage/non utilization of slot resources to transmit more new data.

From the above, it should be appreciated that methods to efficiently use the unoccupied resources in the retransmission slot to achieve a higher throughput are desirable. One approach may include assigning a subset of an RB allocation to a UE for CBG-level retransmission and scheduling another UE in the remaining portion of the RB allocation so as to utilize the entire resource. However, such a solution may depend on the availability of another active UE that may share the unoccupied resources and thus may not work when such an active UE is not available.

In accordance with an aspect of the disclosure, multiple HARQ processes per slot are utilized to facilitate efficient CBG-level HARQ operation. As discussed below, in accordance with this aspect, in addition to the retransmission of failed CBGs corresponding to a previous transmission which may be associated with a TB of a first HARQ process (having a first HARQ process identifier (ID)), additional data associated with another TB of a different HARQ process (having a second/different HARQ process ID) may be transmitted on unoccupied resources of the slot/subframe in which the failed CBGs are retransmitted. In some configurations, retransmission of CBGs corresponding to a first transport block associated with one HARQ process, e.g., having HARQ process ID X, is possible together with the transport block level or CBG level retransmission of one or more other HARQ processes which are different than the HARQ process having ID X.

Figure 5:
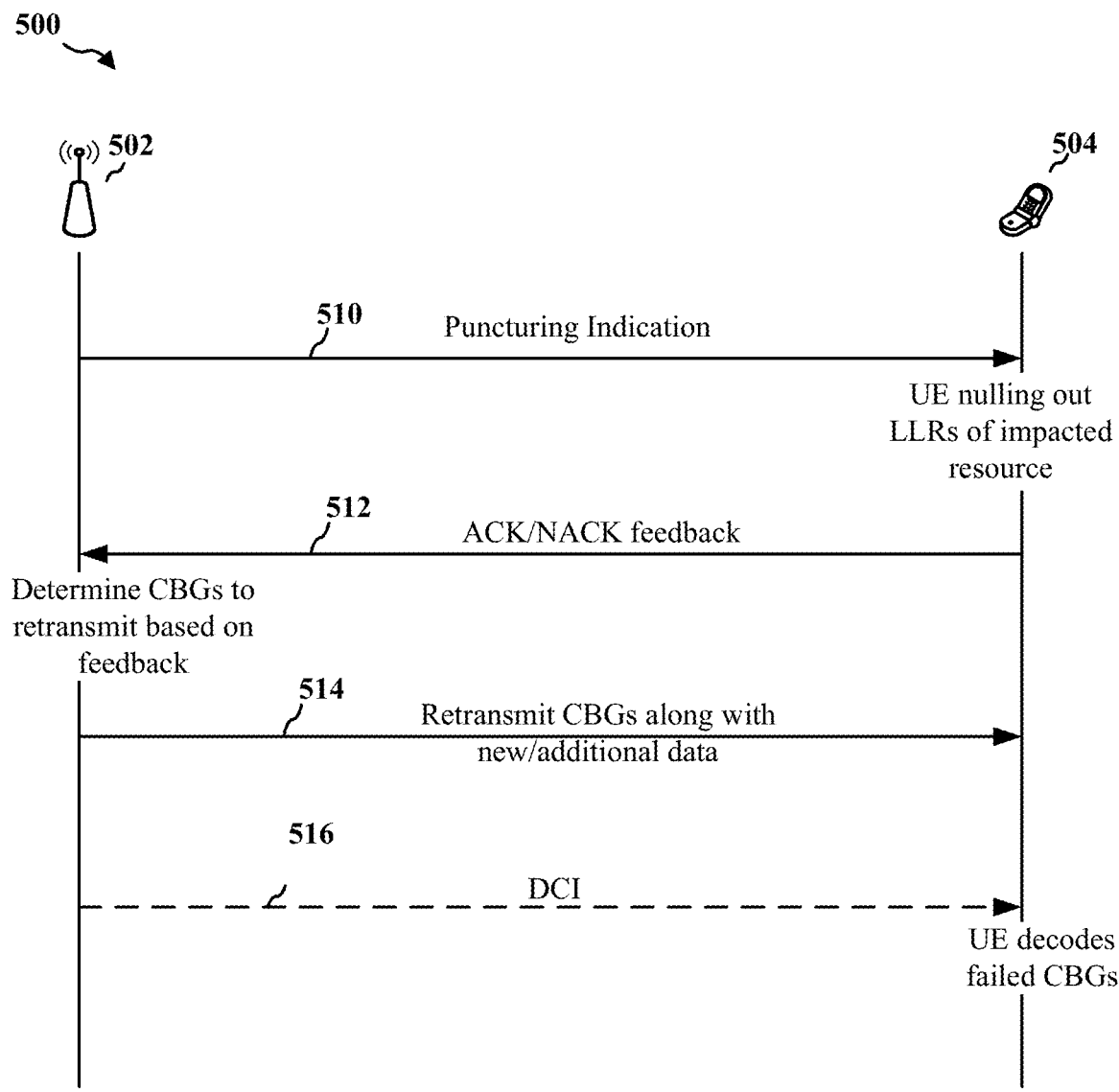
FIG. 5 illustrates signaling exchange between a base station and a UE in a communication system in which various features of the proposed methods may be utilized.

FIG. 5 is a drawing 500 illustrating signaling exchange between a base station 502 and a UE 504 in a communication system in which various features of the proposed methods may be utilized such as, for example, use of multiple HARQ processes per slot. That is, in addition to retransmission of failed CBGs, a new TB with new/additional data of a separate/different HARQ process is transmitted, e.g., in the same slot/aggregated-slot or mini-slot. For discussion purposes, consider the same/similar example as discussed with regard to FIG. 4. The base station 502 may need to send some low latency data while an eMBB communication is ongoing, e.g., eMBB data is being transmitted as an initial (first) transmission. As previously discussed, the base station 502 may puncture one or more eMBB resources to use for communicating URLLC data. The base station 502 may send a puncturing indication 510 to the UE 504 indicating the impacted/affected eMBB resources due to the resource puncturing for URLLC data. Upon receiving the puncturing indication 510, the UE 504 may determine the affected eMBB resources which were punctured for URLLC data and may further determine one or more CBGs transmitted from the base station 502 on the impacted resources in the initial transmission. While the UE 504 may successfully decode CBGs corresponding to the eMBB data on the non-impacted resources (e.g., assuming no interference/noise affected the non-impacted eMBB resources), the same may not be true for one or more CBGs on the affected resources and the UE 504 may determine that one or more CBGs on the impacted eMBB resources could not be properly decoded, e.g., failed cyclic redundancy check (CRC). Accordingly, in some configurations, the UE 504 may null out the LLRs corresponding to the data received on the impacted resources. Also, the UE 504 may fail to decode other CBGs on other non-punctured resources as well, e.g., due to interference, noise etc., causing the decoding to fail. Thus, the UE 504 may determine that retransmission of the one or more CBGs, which could not be decoded, is needed. Accordingly, the UE 504 may send a ACK/NACK feedback 512 to the base station 502 indicating the CBGs which the UE failed to decode thereby allowing the base station 402 to determine which CBGs need to be retransmitted. The ACK/NACK feedback 512 may be a multibit bitmap with each bit corresponding to a CBG and indicating whether the corresponding CBG is decoded or failed decoding. For example, the initial/first transmission (not shown in the example) may include 12 CBGs and the UE 504 may fail to decode 4 CBGs. In this example, the ACK/NACK feedback 512 may be a CBG bitmap such as "111100010111", where "1" may represent an ACK indicating that the corresponding CBG is successfully decoded while "0" represents a NACK indicating that the corresponding CBG failed decoding, e.g., by failing a CRC or some other criteria of checking. The most significant bit (MSB) of the CBG bitmap may correspond to the first CBG and the least SB may correspond to the last CBG.

Next, assuming that the base station 502 properly decodes the ACK/NACK feedback 512 from the UE 504 to determine which CBGs need to be retransmitted, the base station 502 may retransmit the failed CBGs, which the UE 504 failed to decode in the previous transmission, in a retransmission 514. However, in accordance with an aspect, along with the retransmitted CBGs, an additional transport block of new data may also be transmitted to the UE 504. The additional transport block may include codeblocks or CBGs corresponding to new data that was not in the initial (previous) transmission. In some configurations, the retransmitted CBGs are retransmitted in a subframe along with the a transport block of new/additional data. For example, the CBGs may be retransmitted in a first mini-slot associated with a first set of symbols in the subframe while the new data is transmitted in a second mini-slot corresponding to a second set of symbols in the same subframe. In some configurations, the first set of symbols and the second set of symbols are different, e.g., in terms of time. For example, the first set of symbols may be earlier in time than the second set of symbols and thus while being transmitted in the same subframe, the retransmission of the CBGs may be before the transmission of the transport block of new data. Such a division of resources between the transport block including retransmitted CBGs and the transport block of new data may be referred to as a vertical division, e.g., time division multiplexing (TDM) within one slot. However, in some other configurations, the first set of symbols and the second set of symbols are the same and the separation of the resources used for the CBG retransmission and the data is in terms of subcarriers/frequency. Such a division of resources between the CBG retransmission and transmission of new data may be referred to as a horizontal division, e.g., frequency division multiplexing (FDM) over the original set of resources/resource blocks.

In accordance with one aspect of some configurations, the base station 502 may send downlink control information (DCI) 514 to the UE 504 to facilitate decoding and demodulation of the retransmitted CBGs and the new data. For example, in some configurations, the base station 502 may send the DCI including information indicating the subset of CBGs that are being retransmitted to allow the UE 504 to determine, e.g., even prior to decoding the retransmitted CBGs received by the UE 504, whether the base station 502 sent the same CBGs which were identified by the UE 504 in the feedback 512, e.g., CBGs which failed decoding in the previous transmission. It may be possible that the base station 502 may not have correctly decoded the ACK/NACK feedback 512 from the UE 504 and thus may have retransmitted different CBGs than what were requested by the UE 504. In some configurations, the information in DCI 516 indicating the CBGs that are being retransmitted by the base station 502 may be in the form of a CBG bitmap or CBG mask where one or more bits of the bitmap/mask indicate which CBGs are retransmitted. The bitmap or CBG mask in the DCI 516 for the retransmitted CBGs may be based on the ACK/NACK feedback 512 from the UE 504.

In some configurations, for simplicity, mixing up to 2 HARQ processes, e.g., one associated with retransmitted CBGs and the other associated with TB of the new data, is used. Via the DCI 516, the base station 502 may inform the UE 504 which TB and/or set of CBGs is associated with which HARQ process ID and how the resources in the subframe are allocated between the CBGs being retransmitted and the TB of the new data. In frequency domain, the resource allocation may be common for both CBG retransmission and the transmission of the TB corresponding to the new data, while in time domain the two may occupy different resources, e.g., different mini-slots. In some configurations, the CBG retransmission and the TB (corresponding to the new data) transmission of separate HARQ processes are mini-slot based. Thus, the base station 502 may need to inform the UE 504 how the CBG retransmissions and the other TB corresponding to the new data are communicated in the subframe, e.g., by indicating slot/mini-slot boundaries between the two if the separation is in time domain. For example, if the retransmitted CBGs and the TB of the new data is in a slot of a subframe, the first set of OFDM symbols of the slot may be used for the retransmitted CBGs while the another set of OFDM symbols of the slot may be used for the TB of the new data, where the first set of OFDM symbols may be considered to correspond to a first mini-slot and the second set of OFDM symbols may correspond to a second mini-slot. Thus, in some configurations the DCI 516 may indicate a slot/mini-slot boundary between the retransmitted CBGs associated with the first TB and new data associated with a second TB. In some configurations, the DCI 516 may further include information indicating a modulation and coding scheme (MCS) associated with the transmitted new data.

Referring to UE 504, using the received DCI 516, the UE 504 may determine if the requested CBGs are retransmitted, and proceed to decode the received retransmitted CBGs if the retransmission is correct, e.g., if the retransmission carries the CBGs that failed decoding at the UE 504. The CBG retransmission could be based on a special MCS, e.g., implicit MCS which may be derived by the UE 504 based on the knowledge of number of resources allocated for CBG retransmission and the number of CBGs that are retransmitted. Thus, in some configurations, the base station 502 may not explicitly indicate the MCS for the retransmitted CBGs and such information may rather be implicit. The UE 504 may be aware of the resource allocations for retransmission of the CBGs, e.g., based on previous grant/scheduling information communicated from the base station 502, and may determine the number of CBGs being retransmitted, e.g., from the information indicating the CBGs being retransmitted which may be explicitly indicated in the DCI 516 or implicitly conveyed, for example, in CRC bits. However, if based on the received DCI 516 the UE 504 determines that the requested CBGs are not in the received retransmission, the UE 504 may decide not to process, e.g., decode, the received CBGs and may again request retransmission, e.g., by sending a CBG level NACK, of the CBGs. Also, if some requested CBGs are retransmitted but one or more of the requested CBGs are missing in the retransmission, the UE 504 may send another CBG level NACK, e.g., indicating one or more CBGs that still need to be retransmitted from the base station 502.

In some configurations, the CBG identity for retransmission may be signaled explicitly or implicitly. Consider that the UE 504 requests (via the feedback 512 in the uplink) retransmission of a subset of CBGs out of a set of CBGs received in an initial transmission. The CBG retransmission list at the base station 502 may be different from those requested by the UE 504, e.g., due to error(s) at the base station 502 and/or due to incorrect decoding by the base station 502 of the feedback 512 from the UE 504. In order to ensure that the base station 502 and UE 504 are aligned (e.g., in terms of which CBGs need to be retransmitted), two configurations are proposed. In a first configuration, explicit signaling may be used where a list of retransmitted CBGs may be added in the DCI 516. For example, the list may be in the form of a bitmap as discussed above. Upon receiving the DCI 516, UE 504 may be able to determine if the correct CBGs are retransmitted or not. If some CBGs are not correctly retransmitted, the UE 504 may send another ACK/NACK feedback to trigger another retransmission. In a second configuration, implicit signaling may be utilized. For example, when sending the DCI 516, the CBG bitmap at the base station 502 may be included in the CRC generation. For example, while generating the CRC bits for the control payload, e.g., the payload of the DCI 516 for one or more CBGs being retransmitted, the CBG bitmap may be appended to the bits of the payload of the DCI 516 being input to a CRC generation component/module. The resulting CRC bits generated by the CRC generation component may thus implicitly indicate the CBG bitmap as well. In some other configurations, the CBG bitmap may be used to scramble the CRC bits. Thus, the CBG bitmap and/or information indicating the CBGs being retransmitted may be explicitly or implicitly conveyed in many ways. On the UE 504 side, the UE 504 may use the CRC bits when performing the CRC check upon decoding the DCI 516 and if the CRC fails the UE 504 may know that retransmitted CBGs are not the same as requested (e.g., via the feedback 512). In the implicit signaling approach, the DCI information overhead is significantly reduced compared to the explicit signaling case.

In accordance with another aspect, MIMO configuration may be used. In the case of MIMO, transmission of up to 2 transport blocks (TBs) associated with the same HARQ process is possible. That is, the two TBs being transmitted may share the same number of time-frequency resources and be associated with the same HARQ process but the TBs are still orthogonal in the spatial domain. Thus, in MIMO configurations, rather than starting with a single TB for a given HARQ process, a base station may start an initial transmission with 2 TBs associated with the same HARQ process in a MIMO fashion. For example, in an initial transmission, the base station may start with 2 TBs (e.g., TB0, TB1) associated with a same first HARQ process (e.g., HARQ ID=X) in a MIMO fashion, e.g., with a first MIMO transmission of 2 spatially separate streams carrying the 2 TBs, for example, a first stream carrying CBGs corresponding to TB0 and a second stream carrying CBGs corresponding to TB1. At the receiving UE, the UE may fail to decode some CBGs corresponding to each of the 2 TBs and request retransmission of the CBGs that failed decoding. In such a case, with MIMO configuration, the base station may retransmit the failed CBGs corresponding to the 2 TBs (associated with HARQ ID=X) with another one or more new/additional TBs (e.g., TB2, TB3) for new/additional data in a MIMO fashion, where the one or more new/additional TBs may be associated with a (same) second HARQ process (e.g., HARQ ID=Y) different than the first HARQ process. For example, the failed subset of CBGs corresponding to the 2 TBs may be transmitted via a second MIMO transmission that may also include the CBGs of TB2 and TB3. In a manner similar to what was discussed earlier with respect to FIG. 5, the allocation between the CBGs of the first 2 TBs and the new TBs may be at a mini-slot level. However, for the first two TBs (TB0, TB1), a different number of CBGs may need to be retransmitted for each TB, e.g., one of the TBs might need a larger number of CBGs to be retransmitted than the other TB. For example, 2 CBGs corresponding to TB0 may need retransmission while 5 CBGs corresponding to TB1 may need retransmission. Thus, there may be a disparity in the resources that may be needed for the retransmission of the CBGs corresponding to TB0 and TB1. In such a case, in accordance with the features of the present disclosure the resources for both the TBs may still be aligned. For example, in an aspect if TB0 retransmission needs a smaller number of resources, the resources allocated to the TB0 retransmission may be modified to be the same size as the resources allocated for TB1 CBG retransmission, thereby removing the disparity and allowing MIMO configuration to be utilized for retransmission as well. In some configurations, the resources allocated for retransmission of CBGs corresponding to the initial TBs are equalized by modifying the MCS so that a consistent partition is used in the retransmission.

In one configuration, a transmitter, e.g., a base station, may use MIMO for an initial transmission of a set of CBGs, where the set of CBGs may correspond to a first TB and a second TB (e.g., TB0, TB1) and are transmitted with the same HARQ process ID (e.g., associated with a first HARQ process) via a first MIMO transmission. Assuming that a subset of CBGs fail decoding at a receiver, e.g., a UE, the UE may provide a ACK/NACK feedback in response to the first MIMO transmission. The base station may then retransmit the subset of CBGs (associated with the first HARQ process) via a second MIMO transmission in a subframe along with one or more TBs corresponding to new data associated with a different (e.g., second) HARQ process.

Various aspects related to Multi-HARQ ACK/NACK feedback design are also disclosed. In an aspect, additional signaling may be introduced to distinguish between CBG-level ACK/NACK and TB-level feedback. For discussion purposes, consider that along with retransmission of a first TB (e.g., TB0) including some CBGs which a UE (e.g., UE 504) failed to decode in a first transmission, a second TB (e.g., TB1) corresponding to new data is transmitted. The first TB and the second TB may be associated with different HARQ processes. In accordance with an aspect, a multi-HARQ ACK/NACK feedback is supported via which TB level and/or CBG level ACK/NACK may be provided to the base station 502 for the different transmitted/retransmitted CBGs and/or corresponding TBs (associated with different HARQ processes). In an aspect, if at the receiving UE, the second TB (corresponding to the new/additional data) passes decoding, but if one or more retransmitted CBGs in the first TB are not properly decoded, the UE may signal that CBG retransmission of the first TB is needed while also acknowledging receipt of the second TB. That is, the UE 504 may send an ACK/NACK again to request retransmission of the failed CBGs corresponding to the first TB while indicating readiness for a third TB in the subsequent transmission. Likewise, if one or more CBGs of the second TB fail decoding, in order for the UE 504 to request CBG retransmission for failed CBGs of the second TB, the UE 504 may need to send ACK/NACK feedback. In accordance with one aspect of a combined CBG-level and TB-level HARQ operation, the feedback may include: a set of bits for a CBG level ACK/NACK indication corresponding to CBGs of one TB; 1-bit for TB level ACK/NACK; and 1-bit to indicate which TB is doing CBG level ACK/NACK (e.g., to which TB the CBG level ACK/NACK corresponds). In one configuration, if the receiver (e.g., UE) and the transmitter (e.g., base station) coordinate an order of the feedback based on an order of decoding the TBs, the 1-bit to indicate which TB is doing CBG ACK/NACK may be avoided.

In a worst case scenario, retransmitted CBGs of TB0 and the second TB (TB1) both fail. While CBG retransmission for both TBs may be performed, the complexity may be high. For example, if after the retransmission of CBGs in TB0 along with the transmission of TB1, the UE 504 fails to decode some CBGs in both TBs (e.g., some CBGs of both TB0 and TB1), then the UE 504 may need to inform the base station which CBGs corresponding to each of the different TBs (TB0 and TB1) failed. In this case, the UE 504 may need to send two CBG-level indications (e.g., bitmaps) in the ACK/NACK feedback. However, sending two such bitmaps requires a large number of bits which increases the uplink control signaling overhead and complexity. While the additional feedback incurred by multiple CBG-level indications may be acceptable in some configurations, since the overall complexity and uplink signaling overhead is increased in this approach, sending such feedback may not be desirable in many cases. Alternatively, in such a scenario, in accordance with one aspect, the UE 504 may select one of the TBs for which retransmission of CBGs may be requested and ignore the other TB to avoid signaling overhead and complexity. In such a case, the UE 504 may be configured to send a feedback with: 1-bit TB level NACK for one of the TBs (e.g., TB0), a set of bits for the other TB (CBG level CK/NACK, e.g., a bitmap for the failed CBGs for the other TB (e.g., TB1), and 1-bit eto indicate/identify which TB is doing the CBG level ACK/NACK. The 1-bit TB level NACK for the chosen TB may simply indicate that the UE failed to decode the given TB. This allows reduced overhead in uplink signaling for the feedback.

In a further aspect, features related to CBG granularity design are disclosed. In some configurations, an adaptive CBG granularity may be utilized where the CBG size is based on MCS and/or transport block size. In some configurations, there may be no fixed grouping of 1 or 2 CBs per CBG per configuration, but the CBG size may be transport block size dependent. The mapping could be deterministic, or semi-statically configured based on CBG configuration. For example, the CBG size may be dependent on the number of CBs. In some other configurations, CBG size may be more dynamic and may be dependent on number of CBG failures in a previous transmission. In particular, the number of CBs in each CBG could be different in a first (e.g., initial) transmission and the re-transmissions. For example, the number of CBs in each CBG of TB0 in an initial transmission from the base station 502 to the UE 504 may be different than the number of CBs in each retransmitted CBG in TB0 in a retransmission.

Figure 6:
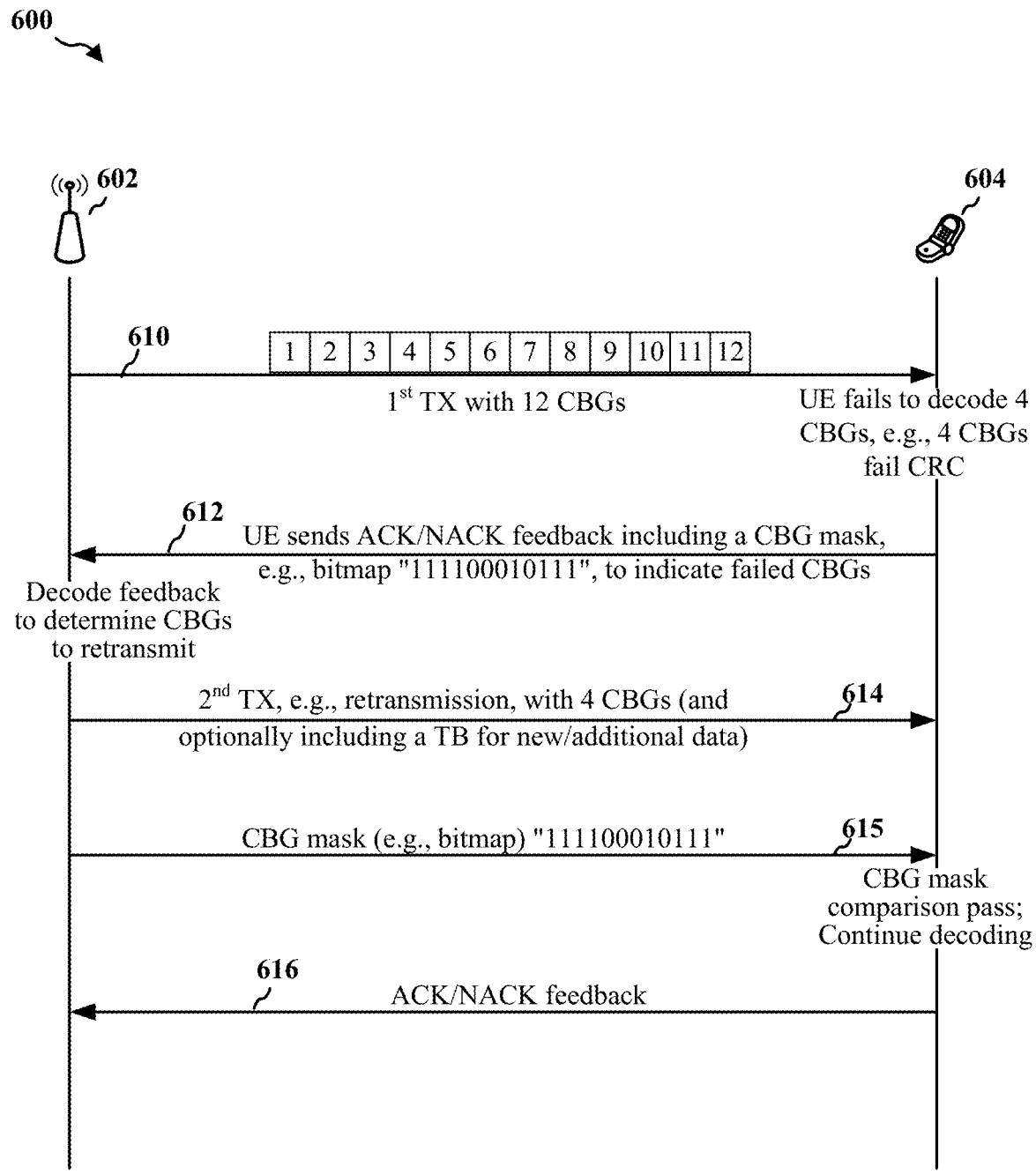
FIG. 6 illustrates one specific example of signaling exchange between a base station and a UE.

FIG. 6 illustrates a drawing 600 showing an example of signaling exchange between a base station 602 and a UE 604 of a communication system in which various features of the proposed methods may be used. The base station 602 may send an initial transmission 610 with 12 CBGs, e.g., a first TB may include 12 CBGs. Consider that the UE 604 fails to decode 4 CBGs of the initial transmission. For example, the UE 604 may determine that 4 CBGs out of 12 failed a CRC check. The UE 604 may send an ACK/NACK feedback 612 including a CBG mask/bitmap to ACK/NACK the decoded CBGs indicating which CBGs were successfully decoded and which failed decoding. The indication for failed CBGs may also convey that the UE 604 needs the failed CBGs to be retransmitted. In the illustrated example, the CBG bitmap is shown as "111100010111" where 1 in the CBG bitmap indicates that the corresponding CBG is successfully decoded and 0 indicates that the corresponding CBG is not decoded and need to be retransmitted. Assuming that the base station 602 properly decodes the feedback 612, the base station 602 may determine from the CBG bitmap "111100010111" that the $5^{th}$, $6^{th}$, $7^{th}$ and the $9^{th}$ CBGs are not properly decoded and need to be retransmitted. Accordingly, the base station 602 may send a retransmission 614 with 4 CBGs. In accordance with an aspect, the base station 602 may also send downlink control information 615 including, e.g., a CBG mask/bitmap "111100010111", to indicate which CBGs are retransmitted, to ensure that the base station 602 and UE 604 are in agreement and aligned. The CBG mask/bitmap may be sent to the UE 604 as downlink control information. In some configurations, in addition to the retransmission of the 4 failed CBGs which may be associated with a first TB (e.g., TB0) associated with a first HARQ process (e.g., having a HARQ process ID=X), additional data associated with another TB (e.g., TB1) of a different HARQ process (e.g., having a second HARQ process ID=Y) may be transmitted on other unoccupied resources of the subframe in which the 4 failed CBGs are retransmitted. Upon receiving the CBG bitmap from the base station 602, the UE 604 may compare the CBG bitmap sent in the ACK/NACK feedback 612 with the received CBG bitmap in 615. In the example, since the two bitmaps match, the UE 604 may determine that correct CBGs have been retransmitted and proceeds to decode the CBGs. Upon successful/unsuccessful decoding, the UE 604 may send an ACK/NACK 616 to the base station 602. In some configurations, where an additional TB (e.g., TB1) corresponding to new/additional data is received along with the TB (e.g., TB0) including the retransmitted CBGs, the ACK/NACK 616 may be a multi-HARQ ACK/NACK feedback including a TB or CBG level ACK/NACK for the data in TB0 and a TB or CBG level ACK/NACK for the data in TB1. For example, the UE 604 may send ACK/NACK feedback 616 including a single bit indicating an ACK or NACK for one TB (e.g., a TB level ACK/NACK for TB0), and a set of bits providing CBG level ACK/NACK indication for CBGs of the other TB (e.g., a CBG level ACK/NACK for TB1 indicating which CBGs of TB1 successfully decoded and which ones failed decoding). In another example, the UE 604 may include a CBG level ACK/NACK for TB0 and a TB level ACK/NACK for TB1. In addition, in case of the multi-HARQ ACK/NACK feedback, the feedback 616 may further include 1-bit to indicate which TB (e.g., TB0 or TB1) is doing CBG level ACK/NACK.

Figure 7:
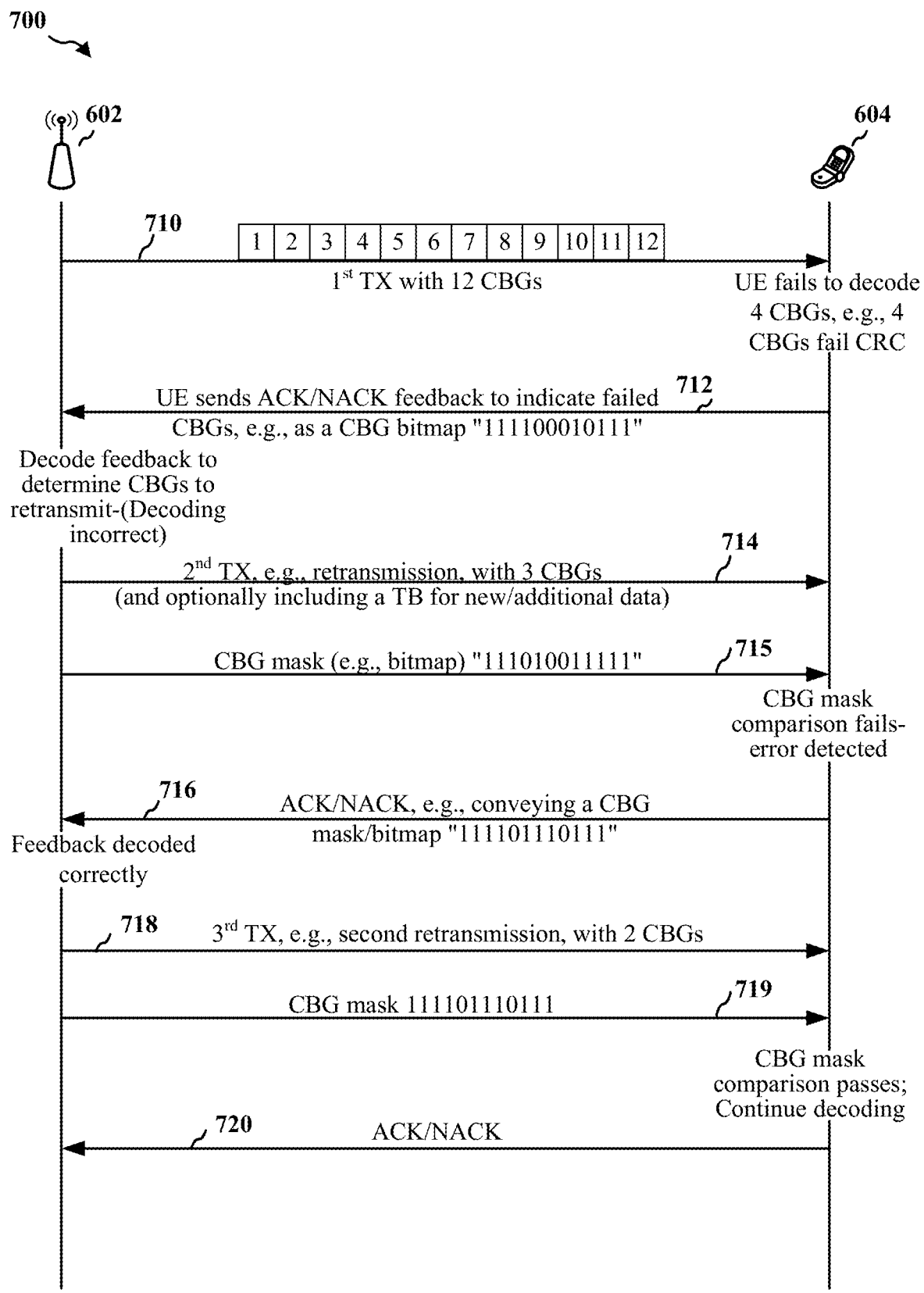
FIG. 7 illustrates another example of signaling exchange between a base station and a UE in a case where the multiple ACK/NACK feedbacks may be involved for CBG retransmission.

FIG. 7 illustrates a drawing 700 showing another example of signaling exchange between the base station 602 and the UE 604 in a communication system in which various features of the proposed methods may be utilized. The example illustrates a scenario where an error occurs at the base station while decoding ACK/NACK feedback. In this example, the base station 602 may send an initial transmission 710 with 12 CBGs, e.g., a first TB may include 12 CBGs. Consider that the UE 604 fails to decode 4 CBGs of the initial transmission. The UE 604 may send an ACK/NACK feedback 712 including a CBG mask/bitmap to ACK/NACK the decoded CBGs indicating which CBGs were successfully decoded and which failed decoding. As discussed earlier, the indication for failed CBGs may also convey that the UE 604 needs the failed CBGs to be retransmitted. Similar to FIG. 6 example, for discussion purposes it may be considered that the CBG bitmap in the ACK/NACK feedback 712 is "111100010111" where 1 indicates that the corresponding CBG is successfully decoded and 0 indicates that the corresponding CBG is not successfully decoded and need to be retransmitted. The base station 602 may receive the feedback 712 and may attempt to decode the feedback 712. For purposes of this example, consider that a decoding error occurs causing improper decoding of the feedback 712 at the base station 602 and/or somehow the decoded CBG bitmap is corrupted. Thus, rather than the actual CBG bitmap "111100010111", the base station 602 recovers a bitmap, e.g., "111010011111" and thus incorrectly determines that the $4^{th}$, $6^{th}$, and $7^{th}$ CBGs are not properly decoded by the UE 604 and need to be retransmitted. Accordingly, based on the determined CBG bitmap the base station 602 may send a retransmission 714 with 3 CBGs. The base station 602 may further send a DCI 715 including a CBG mask/bitmap "111010011111" to indicate the CBGs that are retransmitted. As discussed above, in some configurations, in addition to the retransmission of the failed CBGs which may be associated with a first TB (e.g., TB0) associated with a first HARQ process (e.g., HARQ process ID=X), another TB (e.g., TB1) of additional/new data associated with a different HARQ process (e.g., HARQ process ID=Y) may be transmitted on other unoccupied resources of the same subframe in which one or more CBGs are retransmitted. For discussion purposes, consider that in addition to the retransmission of the 3 CBGs in a first transport block TB0, a second TB (TB1) corresponding to new/additional data is also transmitted in the same subframe/slot that carries the retransmission 714.

Upon receiving the CBG bitmap from the base station 602, the UE 604 may compare the bitmap sent in the ACK/NACK feedback 712 with the received CBG bitmap in DCI 715. In the example, since the two CBG bitmaps are different, the comparison fails and thus the UE 604 may determine that some of the requested CBGs have not been retransmitted and another CBG level indication may be needed to request retransmission, e.g., retransmission of the $5^{th}$ and the $9^{th}$ CBGs in the illustrated example. Furthermore, assuming that TB1 (second TB) corresponding to new/additional data is also transmitted by the base station 602 and received by the UE 604 along with the retransmission 714 (e.g., in the same subframe), the UE 604 may attempt to decode TB1. As discussed earlier, in such a case TB0 and TB1 are associated with different HARQ processes. In accordance with an aspect, the UE 604 may then send a multi-HARQ ACK/NACK feedback 716 including a CBG mask/bitmap "111101110111" to the base station 602, e.g., indicating the 2 CBGs (e.g., the $5^{th}$ and the $9^{th}$ CBGs in the example) that still need to be retransmitted. Additionally, depending on whether or not TB1 is successfully decoded, the ACK/NACK feedback 716 may further include, e.g., a TB level ACK/NACK indication for TB1. For example, if TB1 is decoded successfully, a TB level ACK may be included as part of the multi-HARQ ACK/NACK feedback 716, in addition to the CBG level feedback (e.g., the CBG mask) for the failed CBGs of TB0. If some of the CBGs of TB1 fail decoding, then in some configurations, a TB level NACK may be sent, e.g., as part of the ACK/NACK feedback 716. In addition, the ACK/NACK feedback 716 may further include at least one bit to indicate which TB (e.g., TB0 or TB1) is doing CBG level ACK/NACK. In some configurations, in the cases where a CBG level ACK/NACK feedback is needed for the retransmitted CBGs, a TB level ACK/NACK for TB1 corresponding to the new data rather than a CBG level ACK/NACK feedback may be used in some configurations (as in the above example) to avoid added complexity and extra bits overhead which would otherwise be incurred if a CBG level feedback were to be provided for TB1. However, in some configurations, a CBG level ACK/NACK (e.g., a CBG bitmap) may be provided for TB1 corresponding to the new data. For example, in one case the UE 604 may receive and successfully decode the retransmitted CBGs of the first TB (TB0) while one or more CBGs of the new data in the second TB (TB1) may fail decoding. In such a case, the UE 604 may send a feedback including a TB level ACK for the first TB (TB0) and a CBG level ACK/NACK for the second TB (TB1).

On the base station side, the base station 602 may receive the feedback 716 and attempt to decode the received information. Unlike the first time with feedback 712, in the second instance, assuming that the base station 602 successfully decodes the feedback 716, the base station 602 may determine from the CBG bitmap "111101110111" that the $5^{th}$ and the $9^{th}$ CBGs need to be retransmitted. Accordingly, the base station 602 may send a second retransmission 718 including 2 CBGs, e.g., the $5^{th}$ and the $9^{th}$ CBGs. The base station 602 may also send downlink control information 719 including a CBG mask/bitmap "111101110111" to indicate which CBGs are retransmitted. Upon receipt of the downlink control information 719, the UE 604 may once again perform a CBG bitmap comparison to determine if correct CBGs are retransmitted (e.g., by comparing CBG bitmap of feedback 716 and the received CBG bitmap of downlink control information 719. Considering that the bitmaps match in this example, the comparison performed by the UE 604 may indicate a pass and the UE 604 may proceed to decode the retransmitted CBGs received in the second retransmission 718. Upon successful decoding, the UE 604 may send an ACK 720 to the base station 602 to acknowledge successful decoding of the retransmitted CBGs received in the second retransmission 718.

Figure 8:
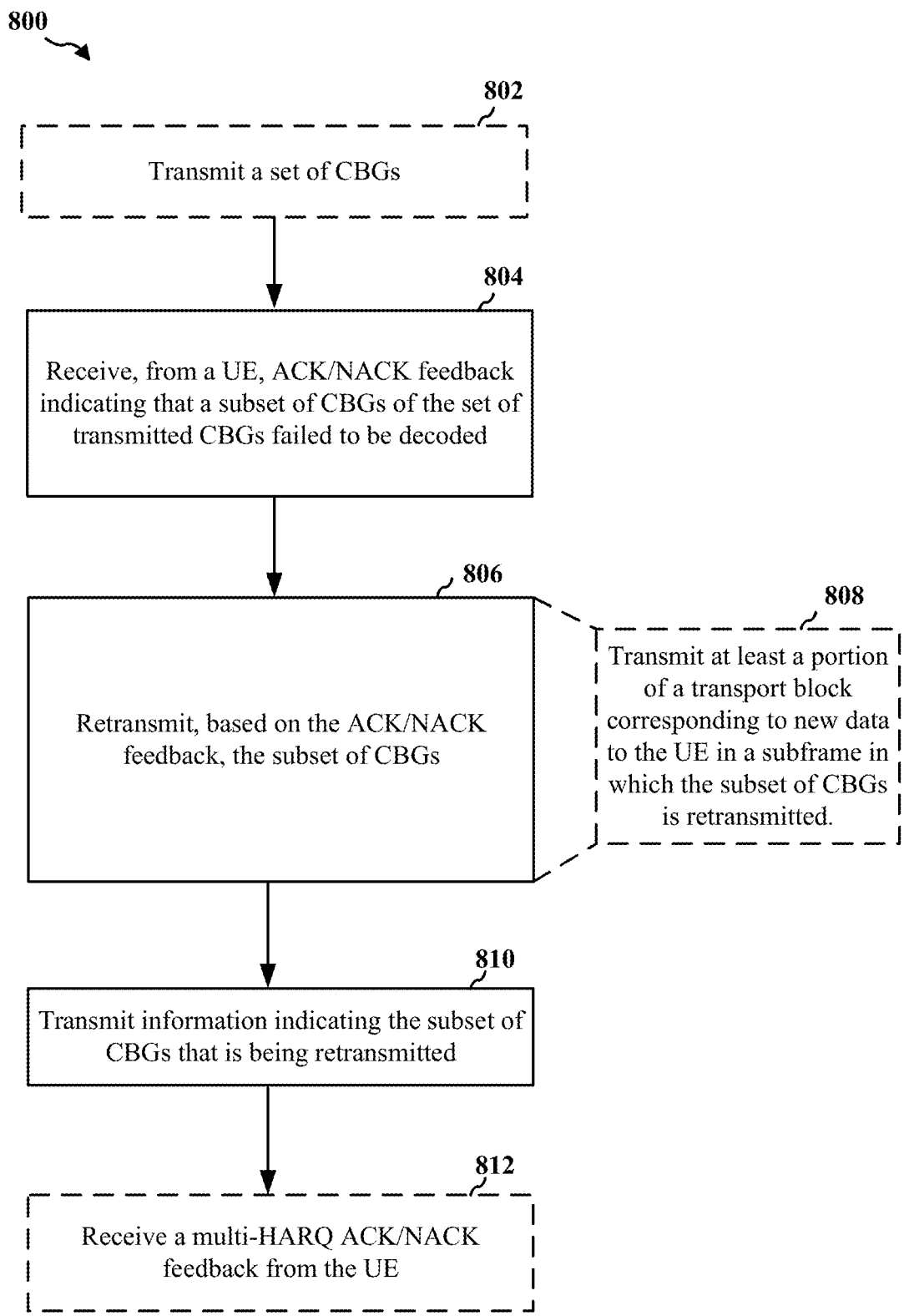
FIG. 8 is a flowchart of a method of wireless communication of a base station.

FIG. 8 is a flowchart 800 of a method of wireless communication. The method of flowchart 800 may be performed by a base station (e.g., the base station 180/502/602). At 802, the base station may transmit a set of CBGs to a UE e.g., as part of an initial transmission. For example, with reference to FIG. 6, the base station may transmit a set of CBGs as part of an initial transmission 610 to the UE 604. In one configuration, the set of CBGs may be part of a transport block/codeword of a DL PDSCH, e.g., where DL PDSCH codeblocks in the transport block are grouped into CBGs. At 804, the base station may receive, from the UE, an ACK/NACK feedback indicating that a subset of CBGs of the set of transmitted CBGs failed to be decoded. For example, referring to FIG. 6, the base station 602 may receive an ACK/NACK feedback 612 from the UE 604 including information indicating the CBGs that were not properly decoded at the UE 604. For example, the information indicating which CBGs have not been properly decoded may be in the form of a CBG bitmap.

At 806, the base station may retransmit, based on the received ACK/NACK feedback, the subset of CBGs. For example, again referring to FIG. 6, the base station 602 may decode the ACK/NACK feedback 612 from the UE 604 and determine which CBGs need to be retransmitted based on the CBG mask/bitmap included in the feedback. Following the determination of the CBGs that need to be retransmitted, the base station 602 may retransmit the requested CBGs (in retransmission 614). As discussed earlier with respect to FIGS. 5-7, in some configurations, in addition to the retransmission of CBGs in a TB, the base station 502 may also transmit a new TB of new/additional data, e.g., data that is not a retransmission. In some configurations, the retransmitted subset of CBGs and the TB of new/additional data may be transmitted in the same subframe. Accordingly, in some configurations as part of the operation at 806 of transmitting a TB including the subset of retransmitted CBGs in a subframe, at 808 the base station may also transmit at least a portion of another TB corresponding to new data to the UE in the same subframe. In some configurations, the subset of CBGs being retransmitted corresponds to a first TB associated with a first HARQ process and the other TB (e.g., second TB) of new/additional data may be associated with a second HARQ process different than the first HARQ process. In some such configurations, the first TB and the second TB may be within a same slot of the subframe.

In some configurations, the first TB may be associated with a first HARQ process and the second TB may be associated with a second HARQ process different than the first HARQ process. In some configurations, the subset of CBGs may be retransmitted in a first mini-slot corresponding to a first set of symbols in the subframe, and the portion of the second TB may be transmitted in a second mini-slot corresponding to a second set of symbols in the subframe. In some configurations, the first set of symbols and the second set of symbols may be different. In some configurations, the first set of symbols may be earlier in time than the second set of symbols. In some other configurations, the first set of symbols and the second set of symbols may be the same. In some configurations, the subset of CBGs may be retransmitted in a first set of resource blocks of the subframe, and the new data may be transmitted in a second set of resource blocks of the subframe, where the first set of resource blocks may be different than the second set of resource blocks.

At 810, the base station may transmit information indicating the subset of CBGs that are being retransmitted. For example, referring to FIG. 5, the base station 502 may transmit DCI 516 that includes a CBG bitmap indicating the CBGs that are being retransmitted. Similarly, with reference to FIG. 6, the base station 602 may transmit the CBG mask/bitmap "111100010111" indicating the retransmitted CBGs.

In some configurations, the information indicating the subset of CBGs that are being retransmitted may include a CBG level bitmap that indicates which CBGs are being retransmitted. For example, with reference to FIG. 6, the information indicating the subset of CBGs being retransmitted may be the CBG mask/CBG bitmap 111100010111 indicating that the $5^{th}$, $6^{th}$, $7^{th}$ and the $9^{th}$ CBGs are retransmitted. In some configurations, the information indicating the subset of CBGs that are being retransmitted may be transmitted in a DCI message. In some configurations, the DCI message may further indicate at least one of a slot boundary between the first TB corresponding to the retransmitted subset of CBGs and the second TB corresponding to the new data, or a modulation and coding scheme associated with the transmitted new data. In some configurations, the information indicating the subset of CBGs that are being retransmitted is explicitly indicated in the DCI message. In some configurations, the information indicating the subset of CBGs that are being retransmitted is implicitly indicated within cyclic redundancy check (CRC), e.g., with the CBG bitmap being included in the CRC bits.

Based on the DCI message, the receiving UE may determine whether the correct CBGs have been retransmitted. For example, if the DCI includes a CBG bitmap indicating the retransmitted CBGs, the UE may check the received CBG bitmap against the CBG bitmap included in the ACK/NACK feedback sent by the UE to the base station. The UE may then proceed to decode the retransmitted CBGs, e.g., when the correct subset of CBGs have been retransmitted. Assuming that a second TB corresponding to new/additional data is transmitted by the base station along with the first TB including the retransmitted subset of CBGs, the UE may also attempt to decode the CBGs of the second TB. Based on successful/unsuccessful decoding at the UE, at 812 the base station may receive an ACK/NACK (e.g., such as ACK/NACK 616 of FIG. 6) from the UE. The received ACK/NACK may be a multi-HARQ ACK/NACK feedback including feedback regarding both the first and second TBs (assuming the second TB of new data was also transmitted at 808). For example, the multi-HARQ ACK/NACK feedback may include a TB or CBG level ACK/NACK for the data in the first TB0, and a TB or CBG level ACK/NACK for the data in the second TB. The multi-HARQ ACK/NACK may be a multibit feedback including, for example, a single bit indicating an ACK or NACK for one TB (e.g., a TB level ACK/NACK for the first or second TB), and a set of bits providing CBG level ACK/NACK indication for CBGs of the other TB (e.g., a CBG level ACK/NACK for the other one of the first or second TB). Furthermore, in some configurations, the multi-HARQ ACK/NACK feedback may further include 1-bit to indicate which TB (e.g., the first TB or the second TB) is doing CBG level ACK/NACK.

In one particular MIMO configuration, the set of CBGs (e.g. transmitted at 802) corresponds to a first TB and a second TB transmitted via a first MIMO transmission, where the first TB and the second TB may be associated with a first HARQ process, and the ACK/NACK feedback (e.g., received at 804) may be received in response to the first MIMO transmission. In such a MIMO configuration, the subset of CBGs is associated with the first HARQ process and is retransmitted via a second MIMO transmission in a subframe along with one or more TBs corresponding to new data associated with a second HARQ process.

In some configurations, the size of a CBG (e.g., a CBG of the set of CBGs/subset of CBGs being retransmitted) may be configurable based on a size of a transport block to which the CBG corresponds. In some configurations, a number of codeblocks in each CBG of the set of transmitted CBGs is different than a number CBs in each CBG of the subset of CBGs being retransmitted.

Figure 9:
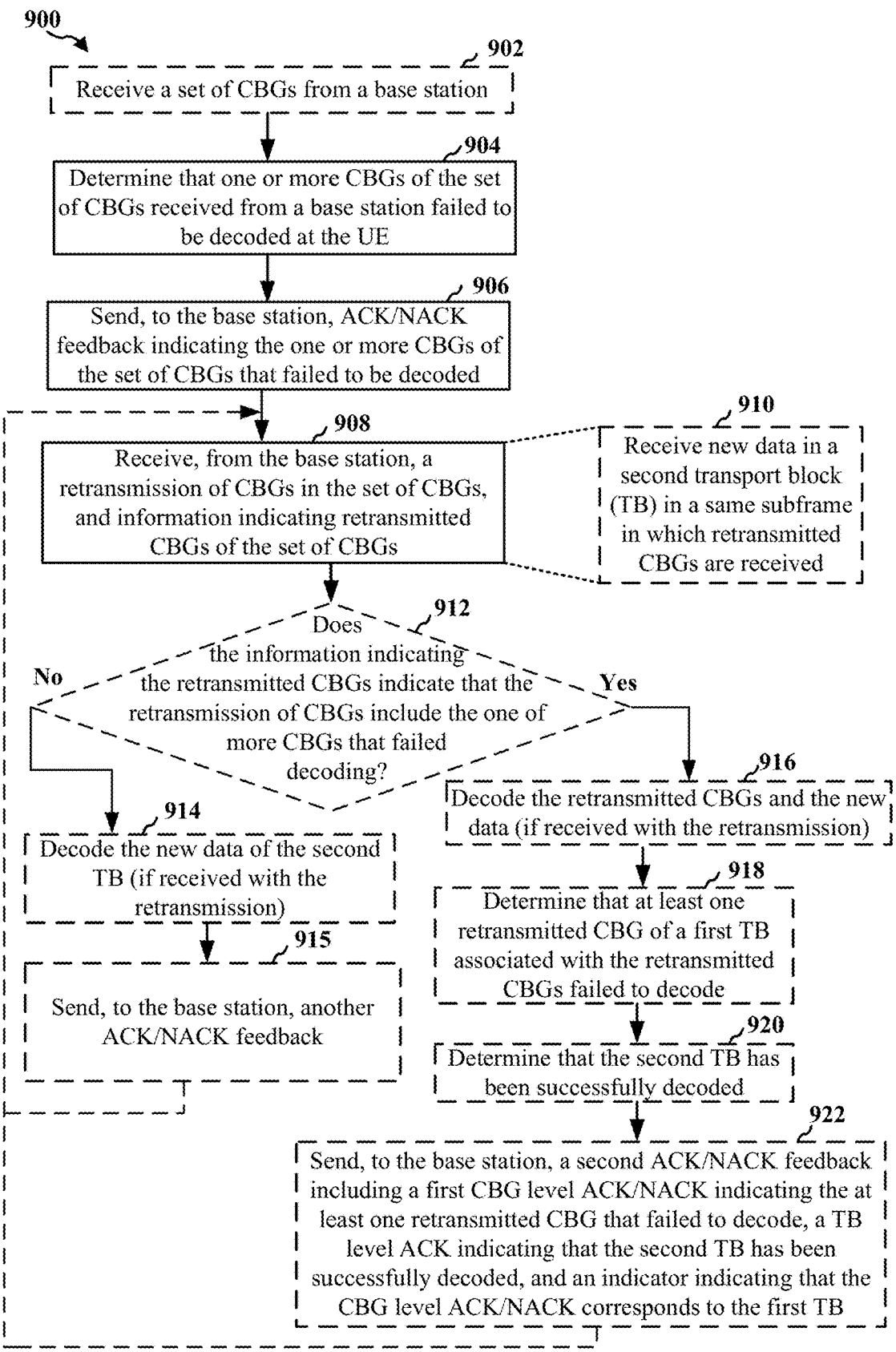
FIG. 9 is a flowchart of a method of wireless communication of a UE.

FIG. 9 is a flowchart 900 of a method of wireless communication. The method of flowchart 900 may be performed by a UE (e.g., such as UE 104/504/604/704/1050/1202). At 902, the UE may receive a set of CBGs from a base station. For example, with reference to FIG. 6, the UE 604 may receive a set of CBGs, e.g., as part of an initial transmission 610, from the base station 602. At 904, the UE may determine that one or more CBGs of the set of CBGs received from the base station failed to be properly decoded at the UE. The determination may be based on, e.g., a failed CRC for the one or more CBGs. For example, referring to FIG. 6, the UE 604 may fail to decode 4 CBGs out of 12 CBG transmitted by the base station 602. For example, the UE 604 may attempt to decode the received 12 CBGs and recover the CRC bits. The UE 604 may then run a CRC and determine that CRC failed for 4 CBGs. The UE may thus conclude that those 4 CBGs have failed decoding. At 906, the UE may send, to the base station, ACK/NACK feedback, indicating the one or more CBGs of the set of CBGs that failed to be properly decoded. In some configurations, the ACK/NACK feedback may be sent by the UE in response to the initial transmission of the set of CBGs received from the base station and upon determining that one or more CBGs of the set of CBGs failed decoding at the UE. As discussed earlier in detail, in some configurations, the ACK/NACK feedback may include a CBG bitmap indicating CBGs (e.g., a subset of the set of CBGs) that failed to be properly decoded. For example, with reference to FIG. 6 the ACK/NACK feedback 612 may convey a CBG bitmap "111100010111", where a "0" location in the bitmap may indicate the index of a failed CBG. Decoding failure may be determined from a failed a CRC for the one or more CBGs. In a way, the ACK/NACK feedback from the UE to the base station also serves as a request for retransmission of the one or more CBGs that failed decoding at the UE.

At 908, the UE may receive a retransmission of CBGs in the set of CBGs from the base station, and information indicating the retransmitted CBGs, e.g., indicating the CBGs from the set of CBGs that are retransmitted. If the base station correctly decoded the ACK/NACK feedback from the UE, then the retransmission of CBGs may include the one or more CBGs that failed decoding (that were requested to be retransmitted). For example, referring again to FIG. 6, the UE 604 may receive a retransmission 614 from the base station 602 including the 4 CBGs and information, e.g., the CBG bitmap "111100010111", indicating the CBGs that are retransmitted from the base station 602. The CBG mask/bitmap indicating the retransmitted CBGs may be received in a DCI message such as DCI 615 of FIG. 6. While in some configurations, the information indicating the retransmitted CBGs of the set of CBGs is explicitly indicated in the DCI message as a CBG level bitmap indicates which CBGs of the set of CBGs are being retransmitted, in some other configurations, the information indicating the retransmitted CBGs of the set of CBGs is implicitly indicated in the DCI message within the CRC bits of the DCI message. In such configurations, the UE 604 may determine the CBGs in the set of CBGs that are being retransmitted based on the CRC bits. If an error/mistake occurs at the base station in decoding the ACK/NACK feedback from the UE, then the retransmission may not include the same one or more CBGs that failed decoding at the UE and for which retransmission was requested.

In some configurations, the subset of CBGs may be received in a subframe, and the UE may further receive new/additional data (e.g., that is not a retransmission) from the base station in the same subframe as illustrated at 910. For example, in some configurations, in addition to the retransmission of CBGs that may be included in a first TB, the base station 602 may also transmit a second TB (or at least a portion of a second TB) of new/additional data in the same subframe/slot that carries the TB of retransmitted CBGs. In some configurations, the first TB may be associated with a first HARQ process and the second TB may be associated with a second HARQ process different than the first HARQ process. In some configurations, the retransmitted CBGs may be received in a first mini-slot corresponding to a first set of symbols in the subframe, and the new data may be received in a second mini-slot corresponding to a second set of symbols in the subframe. In some configurations, in addition to communicating a CBG bitmap, the DCI may further indicate at least one of a slot boundary between a first TB corresponding to the retransmitted CBGs and the second TB corresponding to the new data, or a MCS associated with the new data.

In some configurations, at 912 the UE may determine whether the retransmission of CBGs include the one of more CBGs that failed to decode based on the information indicating the retransmitted CBGs of the set of CBGs. For example, with reference to FIG. 7, the UE 604 may compare the CBG mask/bitmap received in the DCI 715 from the base station 602 with the CBG bitmap indicated in the ACK/NACK feedback 712 to see if there is a match. In some configurations, the operation may proceed based on the determination at 912. In some configurations, upon determining at 912 that the retransmitted CBGs as indicated by the DCI do not correspond to the CBGs for which retransmission was requested (e.g., CBG bitmaps do not match), the UE may determine which of the one or more CBGs of the subset still needs to be retransmitted. Assuming that the UE receives a second TB of new data (e.g., as discussed at 910) along with the first TB of retransmitted CBGs, in one configuration at 914 the UE may attempt to decode the CBGs corresponding to the new data of the second TB. Since the UE already determined at 912 that the retransmission of CBGs does not include all of the one or more CBGs for which retransmission was requested (CBG bitmap comparison failed), at 915 the UE may send another ACK/NACK feedback to the base station including a CBG level ACK/NACK (e.g., a CBG bitmap) indicating CBGs that still need to be retransmitted by the base station. For example, the another ACK/NACK feedback may be the ACK/NACK feedback 716 discussed supra in connection with FIG. 7. In one configuration, depending on whether or not the second TB corresponding to new data is successfully decoded, the another ACK/NACK feedback may further include, e.g., a TB level ACK/NACK indication for the second TB. In addition, the another ACK/NACK feedback 716 may further include at least one bit to indicate which TB (e.g., first TB or second TB) is doing CBG level ACK/NACK. The operation may continue in this manner (as indicated by the loop back to 908) until the set of CBGs may be successfully received and decoded or the process may be terminated at some point after certain predetermined number of iterations.

On the other hand, if based on the information indicating the retransmitted CBGs of the set of CBGs (e.g., the DCI) it is determined at 912 that the retransmission of CBGs does include the one of more CBGs (e.g., CBG bitmaps match), the operation may proceed to 916. At 916 the UE may proceed to decode the received retransmitted CBGs of the first TB and the CBGs corresponding to the new data of the second TB (assuming for discussion purposes that the second TB of new data is received along with the retransmitted CBGs). While the operation may proceed in different ways depending on the result of decoding at 916 as may be understood by a person skilled in the art, to facilitate an understanding and simplicity, one specific example is discussed with respect to the operations at 918, 920, and 922.

For discussion purposes, consider that at least some retransmitted CBGs of the first TB received by the UE fail to decode while the CBGs of the second TB corresponding to new data are successfully decoded. At 918, the UE may determine that at least one retransmitted CBG of the first TB failed to decode. For example, with reference to FIG. 6, the UE 604 may attempt to decode the 4 retransmitted CBGs of the first TB received in the retransmission 614 and may, for example, fail to decode at least one retransmitted CBG. However, at 920 the UE may determine that the CBGs corresponding to the second TB are successfully decoded. Since the second TB successfully decoded, in accordance with one aspect the UE may simply provide a TB level ACK/NACK feedback (e.g., 1 bit) to indicate to the decoding status of the second TB to the transmitter (e.g., base station). However, since at least one retransmitted CBG of the first TB failed to decode, if a retransmission of the at least one CBG is desired the UE may need to indicate which at least one retransmitted CBG failed decoding by providing a CBG level ACK/NACK. Thus, in accordance with an aspect, at 922 the UE may send a second ACK/NACK feedback including a first CBG level ACK/NACK indicating the at least one retransmitted CBG that failed to be decoded, a TB level ACK indicating that the second TB has been successfully decoded, and an indicator indicating that the CBG level ACK/NACK corresponds to the first TB. For example, with reference to FIG. 6, if decoding fails for at least one retransmitted CBG corresponding to the first TB (TB1) received in the retransmission 614 while decoding succeeds for the second TB (TB1) received with the retransmitted CBGs, the UE 604 may send the ACK/NACK feedback 616 including a CBG level ACK/NACK for TB0 to indicate the at least one CBG that failed to decode, a TB level ACK for TB1 to indicate that TB1 successfully decoded, and an indicator (1-bit) to indicate that the CBG level ACK/NACK (e.g., CBG bitmap) is for CBGs of the first TB (TB0). In another case, all retransmitted CBGs corresponding to the first TB may successfully decode while one or more CBGs of the second TB corresponding to new data may fail decoding. In such as case, the second ACK/NACK feedback may include a TB level ACK (1-bit) for the first TB, a CBG level ACK/NACK for the second TB (multibit), and an indicator (1-bit) to indicate that the CBG level ACK/NACK corresponds to the second TB (TB1). The operation may continue in this manner (as indicated by the loop back to 908) until the set of CBGs may be successfully received and decoded or the process may be terminated at some point after certain predetermined number of iterations. For example, in response to the second ACK/NACK, the UE may receive another transmission that may include the at least one retransmitted CBG (and optionally another TB of new data). The UE may also receive DCI indicating the CBGs being retransmitted. The UE may subsequently perform similar processing as discussed with respect to 912 through 920 and based on a result of decoding send an ACK/NACK. For example, assuming successful decoding, the UE may send an ACK and no further retransmission may be needed.

Figure 10:
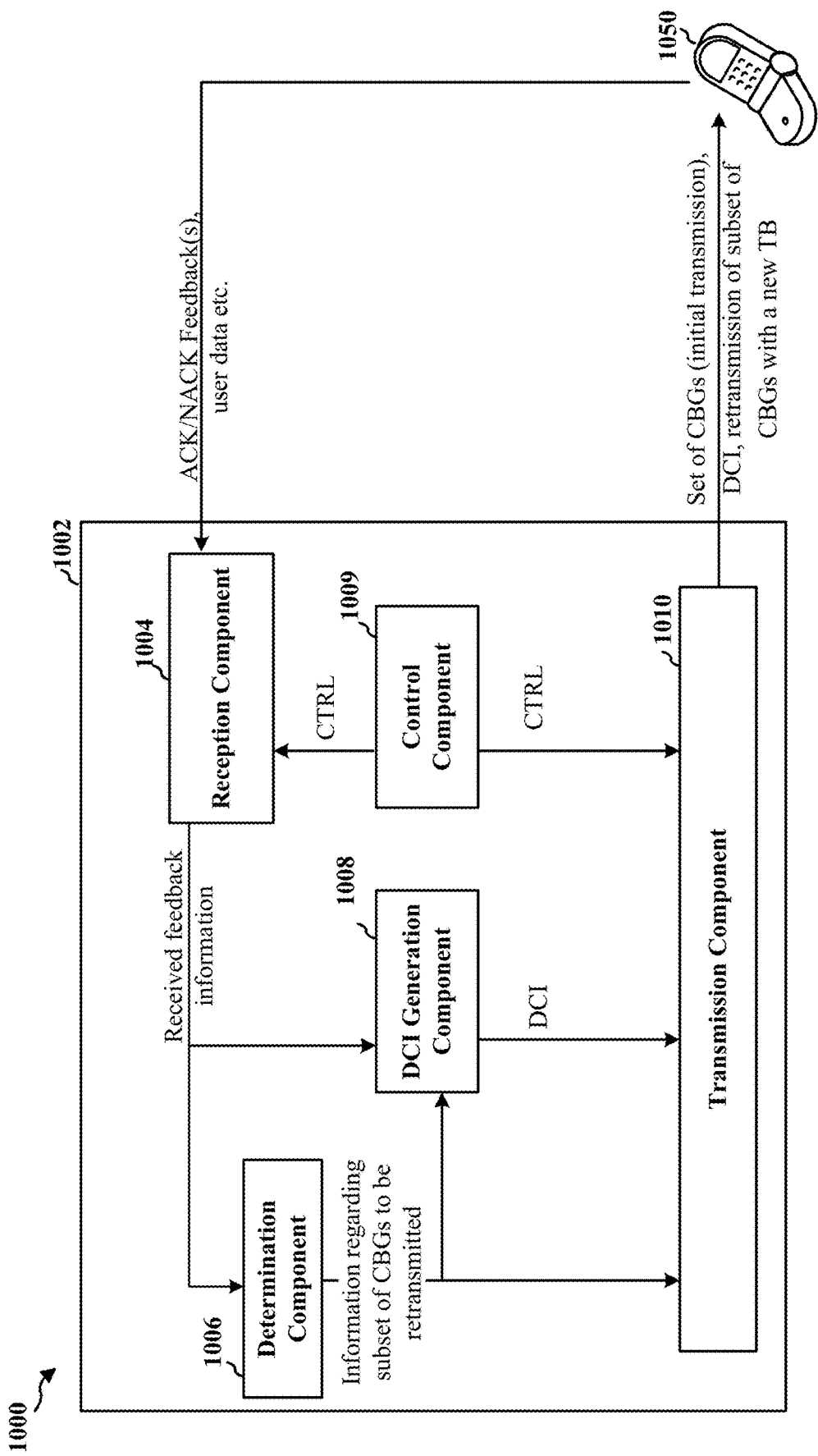
FIG. 10 is a conceptual data flow diagram illustrating the data flow between different means/components in an exemplary apparatus.

FIG. 10 is a conceptual data flow diagram 1000 illustrating the data flow between different means/components in an example apparatus 1002. The apparatus 1002 may be a base station (e.g., such as base station 180, 310, 502, 602, 1250). The apparatus 1002 may include a reception component 1004, a determination component 1006, a DCI generation component 1008, a control component 1009, and a transmission component 1010.

The reception component 1004 may be configured to receive messages and/or other information from other devices including, e.g., UE 1050. The signals/information received by the reception component 1004 may be provided to one or more components of the apparatus 1002 for further processing and use in performing various operations in accordance with the methods discussed supra including the method of flowchart 800. In some configurations, the reception component 1004 may receive, from a UE (e.g., UE 1050), ACK/NACK feedback indicating that a subset of CBGs of a set of transmitted CBGs failed to be decoded at the UE. In some configurations, the ACK/NACK feedback is in response to an initial transmission of the set of CBGs from the apparatus 1002 to the UE 1050. For example, referring to FIG. 6, the received ACK NACK feedback may be the ACK/NACK feedback 612 including the CBG bitmap received by the base station 602 from the UE 604.

In some configurations, reception component 1004 may process the received ACK/NACK feedback and provide the feedback information to the determination component 1006. The determination component 1006 may be configured to determine, based on the information (e.g., CBG mask/bitmap in the received feedback) the subset of the CBGs that need to be retransmitted to the UE 1050. The determination component 1006 may be further configured to provide the information regarding the subset of CBGs to be retransmitted to the DCI generation component 1008 and/or the transmission component 1010.

The DCI generation component 1008 may be configured to generate downlink control information including information indicating the subset of CBGs being retransmitted by the apparatus 1002 in response to the received ACK/NACK feedback. In some configurations, based on the input from the determination component 1006, the DCI generation component 1008 may determine which CBGs are being retransmitted and include the information indicating the subset of CBGs being retransmitted in a DCI message generated by the DCI generation component 1008. In some configurations, the information indicating the subset of CBGs being retransmitted may be a CBG bitmap generated by the DCI generation component 1008. For example, with reference to FIG. 6, the information indicating the subset of CBGs being retransmitted may be the CBG bitmap included in the DCI 615. In some other configurations, rather than an explicit indication of the CBGs being retransmitted, the CBG bitmap indicating the subset of CBGs being retransmitted may be conveyed via implicit signaling, e.g., in the CRC bits. For example, in some configurations, the CBG bitmap may be implicitly indicated in the CRC bits of the DCI payload as discussed in more detail with respect to FIG. 5.

The transmission component 1010 may be configured to transmit data and/or other control information to one or more external devices, e.g., including UE 1050. In some configurations, the transmission component 1012 alone, in combination with and/or under the control of the controller/control component 1009, may be configured to transmit, e.g., a set of CBGs associated with a TB to the UE 1050, e.g., in a first/initial transmission. For example, with reference to FIG. 6, the initial transmission 610 may include a TB including 12 CBGs to the UE. The transmission component 1010 alone, in combination with and/or under the control of a controller/control component 1009, may be further configured to retransmit the subset of CBGs based on the received ACK/NACK feedback. The transmission component 1010 may be further configured to transmit the information indicating the subset of CBGs being retransmitted, e.g., as part of the DCI. In some configurations, the subset of CBGs is retransmitted in a subframe and corresponds to a first TB. In some such configurations, the transmission component 1010 may be further configured to transmit at least a portion of a second TB corresponding to new data to the UE in the subframe. In some such configurations, the generated DCI (from DCI generation component 1008) may further indicate at least one of a slot boundary between a first transport block corresponding to the subset of CBGs and a second transport block corresponding to new data, or a MCS associated with the new data.

In one MIMO configuration, the initially transmitted set of CBGs may correspond to a first TB and a second TB that may be transmitted by the transmission component 1010 via a first MIMO transmission. In such a MIMO configuration the first TB and the second TB may be associated with a first HARQ process. The subset of CBGs being retransmitted is also associated with the first HARQ process and the transmission component 1010 may be configured to retransmit the subset of CBGs via a second MIMO transmission in a subframe along with one or more TBs corresponding to new data associated with a second HARQ process.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
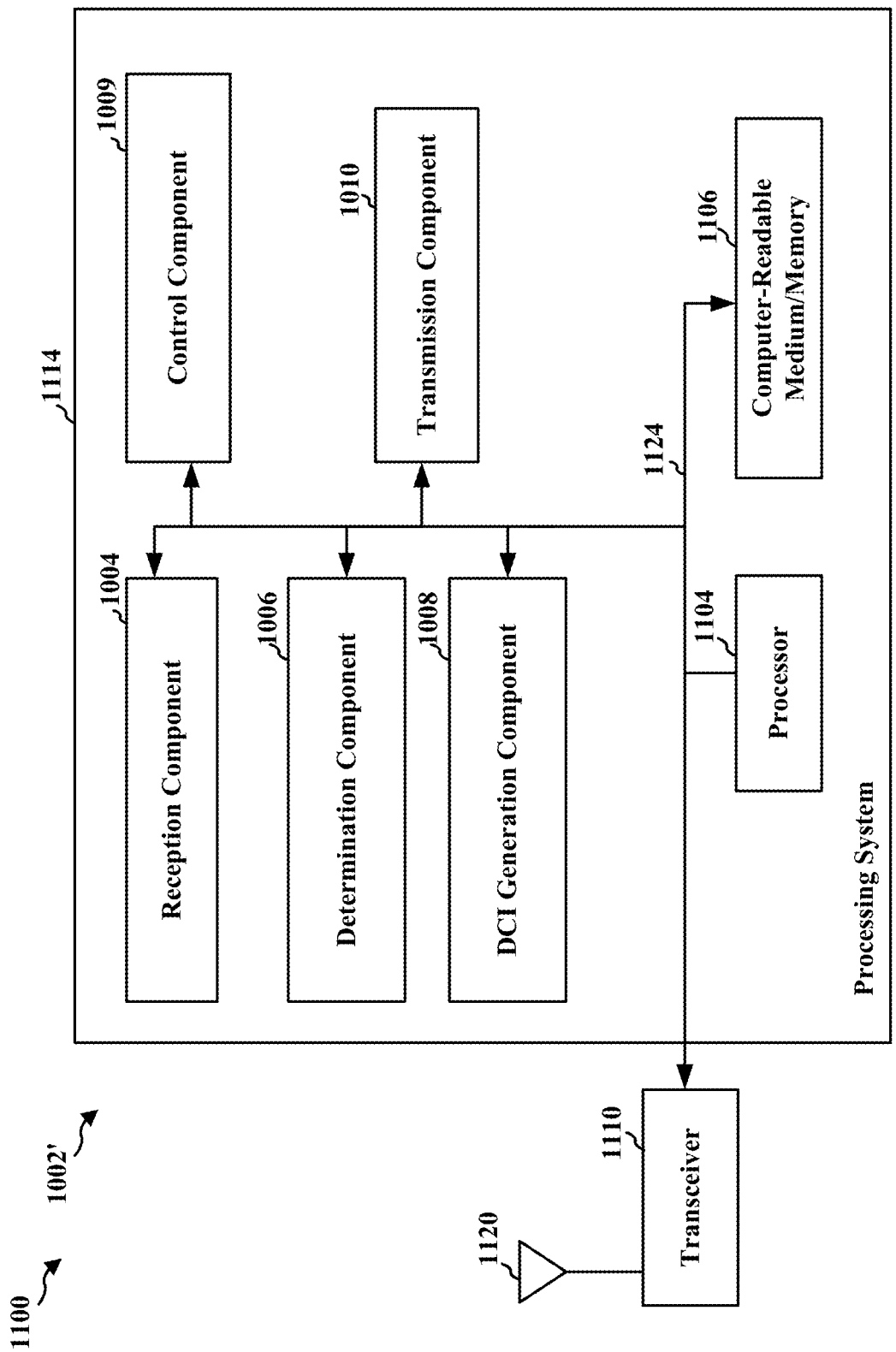
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1009, 1010 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1009, and 1010. The components may be software components running in the processor 1104, resident/stored in the computer-readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication includes means for receiving, from a UE, ACK/NACK feedback indicating that a subset of CBGs of a set of transmitted CBGs failed to be decoded. In some configurations, the apparatus 1002/1002' further comprises means for retransmitting, based on the ACK/NACK feedback, the subset of CBGs. In some configurations, the apparatus 1002/1002' may further include means for transmitting information indicating the subset of CBGs that is being retransmitted.

In some configurations, the subset of CBGs is retransmitted in a subframe and corresponds to a first TB. In one such configuration, the means for transmitting may be further configured to transmit at least a portion of a second TB corresponding to new data to the UE in the subframe. In some configurations, the subset of CBGs is retransmitted in a first mini-slot corresponding to a first set of symbols in the subframe, and the portion of the second TB is transmitted in a second mini-slot corresponding to a second set of symbols in the subframe. The first set of symbols and the second set of symbols may be different. In some configurations, the first set of symbols may be earlier in time than the second set of symbols. The first set of symbols and the second set of symbols may be the same. In one configuration, the subset of CBGs is retransmitted in a first set of resource blocks of the subframe, and the new data is transmitted in a second set of resource blocks of the subframe, where the first set of resource blocks may be different than the second set of resource blocks. In some configurations, the first TB may be associated with a first HARQ process and the second TB may be associated with a second HARQ process different than the first HARQ process.

In one configuration, the set of CBGs corresponds to a first TB and a second TB transmitted via a first MIMO transmission, where the first TB and the second TB may be associated with a first HARQ process, and the ACK/NACK feedback may be received in response to the first MIMO transmission. The subset of CBGs may be associated with the first HARQ process and may be retransmitted via a second MIMO transmission in a subframe along with one or more TBs corresponding to new data associated with a second HARQ process.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
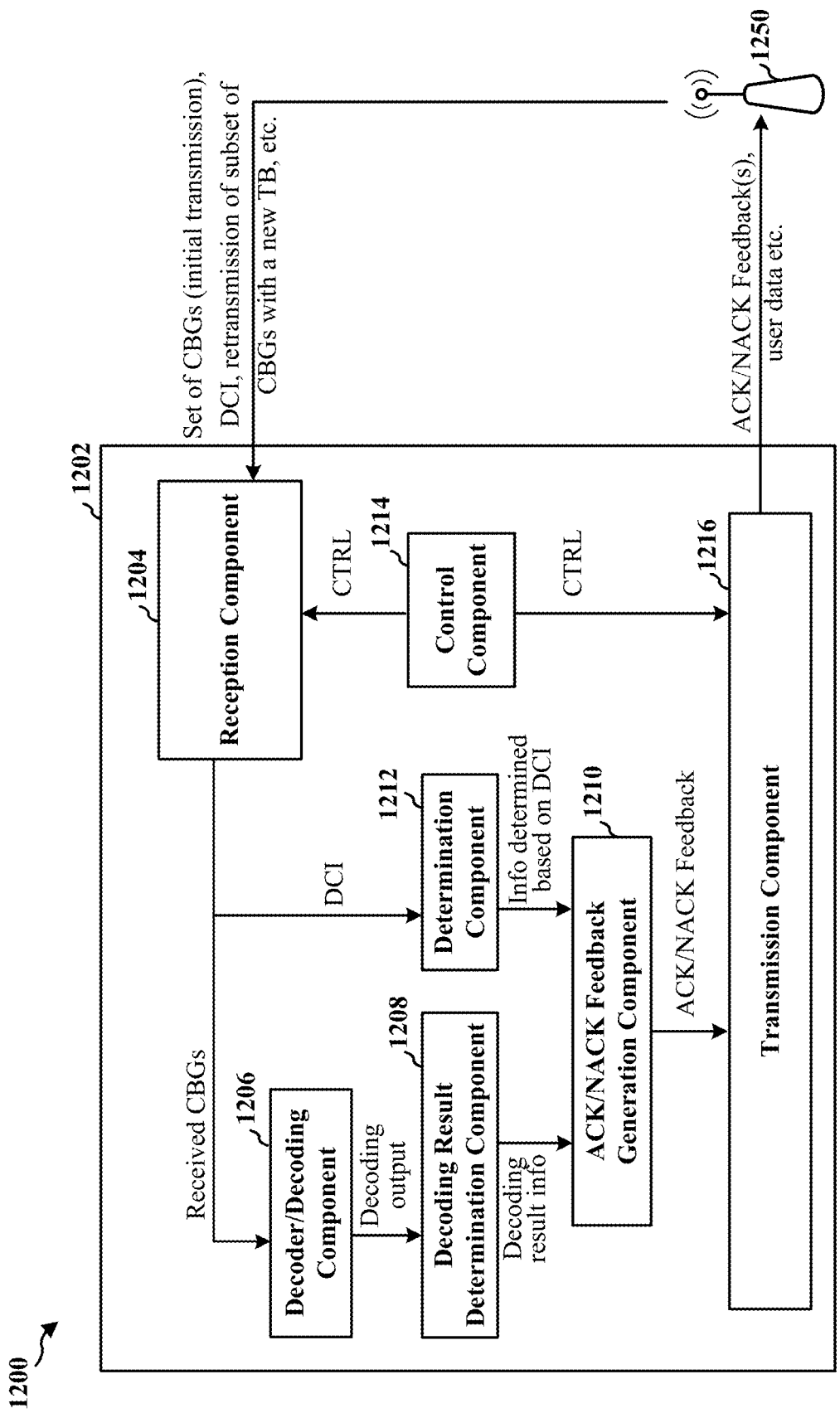
FIG. 12 is a conceptual data flow diagram illustrating the data flow between different means/components in another exemplary apparatus.

FIG. 12 is a conceptual data flow diagram 1200 illustrating the data flow between different means/components in an example apparatus 1202. The apparatus 1202 may be a UE (e.g., such as UE 104, 350, 504, 604, 1050). The apparatus 1202 may include a reception component 1204, a decoder/decoding component 1206, a decoding result determination component 1208, an ACK/NACK feedback generation component 1210, a determination component 1212, a control component 1214, and a transmission component 1216.

The reception component 1204 may be configured to receive messages and/or other information from other devices including, e.g., base station 1250. The signals/information received by the reception component 1204 may be provided to one or more components of the apparatus 1202 for further processing and use in performing various operations in accordance with the methods discussed supra including the method of flowchart 900. In some configurations, the reception component 1204 may receive, from a base station (e.g., base station 1250), a set of CBGs associated with a TB, e.g., in a first/initial transmission. For example, with reference to FIG. 6, the UE 604 may receive the initial transmission 610 that may include a TB including 12 CBGs from the base station 602. In some configurations, the reception component 1204 may be further configured to receive a retransmission of CBGs (e.g., a subset of CBGs from the set of initially transmitted CBGs), and information (e.g., included in DCI) indicating the retransmitted CBGs of the set of CBGs. In some configurations, the retransmitted CBGs may correspond to a first TB received in a subframe. In some such configurations, the reception component 1204 may be further configured to receive at least a portion of a second TB corresponding to new data in the subframe.

The decoder/decoding component 1206 may be configured to decode the received information, e.g., the set of CBGs received in the initial transmission, retransmitted subset of CBGs, and/or other received coded information. In some configurations, the decoding component may be implemented as part of the reception component 1204. The decoding result determination component 1208 may be configured to determine (e.g., based on decoding output received from the decoding component 1206) whether the received set of CBGs is successfully decoded or failed decoding. In some configurations, the decoding result determination component 1208 may include a CRC component to perform a CRC in order determine whether or not a CBG has been successfully decoded. In some configurations, the decoding result determination component 1208 may be implemented as part of the decoding component 1206. In some configurations, the decoding result determination component 1208 may be configured to determine that one or more CBGs of a set of CBGs received from a base station failed to be properly decoded. In some configurations, the decoding result determination component 1208 may be further configured to determine that at least one retransmitted CBG of the first TB associated with retransmitted CBGs failed to be properly decoded and that the CBGs of the second TB (corresponding to new data) has been successfully decoded. The determined decoding result information, e.g., regarding the CBGs that failed decoding may be provided to one or more other components (e.g., such as the ACK/NACK feedback generation component 1210) of the apparatus 1202.

The ACK/NACK feedback generation component 1210 may be configured to generate an ACK/NACK feedback based on information received from the decoding result determination component 1208. For example, the ACK/NACK feedback generation component 1210 may be configured to generate an ACK/NACK feedback indicating the one or more CBGs of the received set of CBGs that failed to be properly decoded. For example, the various ACK/NACK feedbacks sent from a UE to a base station discussed in connection with FIGS. 5-9 may be generated by the ACK/NACK feedback generation component 1210. For example, in one configuration the ACK/NACK feedback generation component 1210 may be configured to generate a second ACK/NACK feedback including a first CBG level ACK/NACK indicating the at least one retransmitted CBG that failed to be properly decoded, a TB level ACK indicating that the second TB has been successfully decoded, and an indicator indicating that the CBG level ACK/NACK corresponds to the first TB.

The determination component 1212 may be configured to process the received DCI to determine various information and/or parameters in accordance with the features of the disclosure. In some configurations, the determination component 1212 may be configured to determine whether a received retransmission of CBGs include the one of more CBGs that failed to be properly decoded based on the information indicating the retransmitted CBGs of the set of CBGs, where the information indicating the retransmitted CBGs may be received as part of the DCI. In some configurations, the information indicating the retransmitted CBGs of the set of CBGs is explicitly indicated in the DCI as a CBG level bitmap that indicates which CBGs of the set of CBGs are being retransmitted. In some such configurations, the determination component 1212 may be configured to compare the CBG level bitmap from the DCI with a CBG mask/bitmap from an ACK/NACK feedback sent in response to determining a failure to decode the one or more CBGs of the initially received set of CBGs. As discussed in detail earlier with respect to FIGS. 6-7, the CBG bitmap comparison may be performed to check if the retransmitted CBGs include the one or more CBGs that failed decoding and that were requested to be retransmitted.

In some configurations, an ACK/NACK feedback may be generated further based on information received from the determination component 1212 indicating whether the retransmitted CBGs are the same as and/or include the CBGs for which retransmission was requested. For example, in one configuration the determination component 1212 may determine based on the DCI that the retransmitted CBGs do not include all the CBGs that failed decoding and for which retransmission was requested (e.g., CBG bitmap comparison by the determination component may have failed). In such a case, based on an input from the determination component 1212, the ACK/NACK feedback generation component 1210 may generate another ACK/NACK feedback (for sending to the base station 1250) indicating the CBGs that still need to be retransmitted.

In some configurations, the determination component 1212 may be further configured to determine, based on the information in the received DCI, at least one of a slot boundary between a first TB corresponding to the retransmitted CBGs of the set of CBGs and a second TB corresponding to new data, or a MCS associated with the new data. In some configurations, the determination component 1212 may be further configured to determine MCS associated with the retransmitted CBGs of the set of CBGs based on a number of resources allocated for CBG retransmission and the information (e.g., in DCI) indicating the retransmitted CBGs of the set of CBGs. In some configurations, the information indicating the retransmitted CBGs of the set of CBGs is implicitly indicated in the DCI within CRC bits and the determination component 1212 may be further configured to determine the retransmitted CBGs of the set of CBGs that are included in the retransmission based on the CRC bits.

The transmission component 1216 may be configured to transmit the ACK/NACK feedback(s), user data and/or other information to one or more external devices, e.g., including base station 1250. In some configurations, the transmission component 1216 alone, in combination with and/or under the control of the controller/control component 1214, may be configured to send ACK/NACK feedback(s) generated by the ACK/NACK generation component in accordance with the methods disclosed supra. In one configuration, the transmission component 1216 alone, in combination with and/or under the control of the controller/control component 1214, may be configured to send the ACK/NACK feedback indicating the one or more CBGs that failed to be properly decoded to the base station 1250. In one configuration, the transmission component 1216 alone, in combination with and/or under the control of the controller/control component 1214, may be configured to send, to the base station 1250, the second ACK/NACK feedback including a first CBG level ACK/NACK indicating the at least one retransmitted CBG that failed to be properly decoded, a TB level ACK indicating that the second TB has been successfully decoded, and an indicator indicating that the CBG level ACK/NACK corresponds to the first TB.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
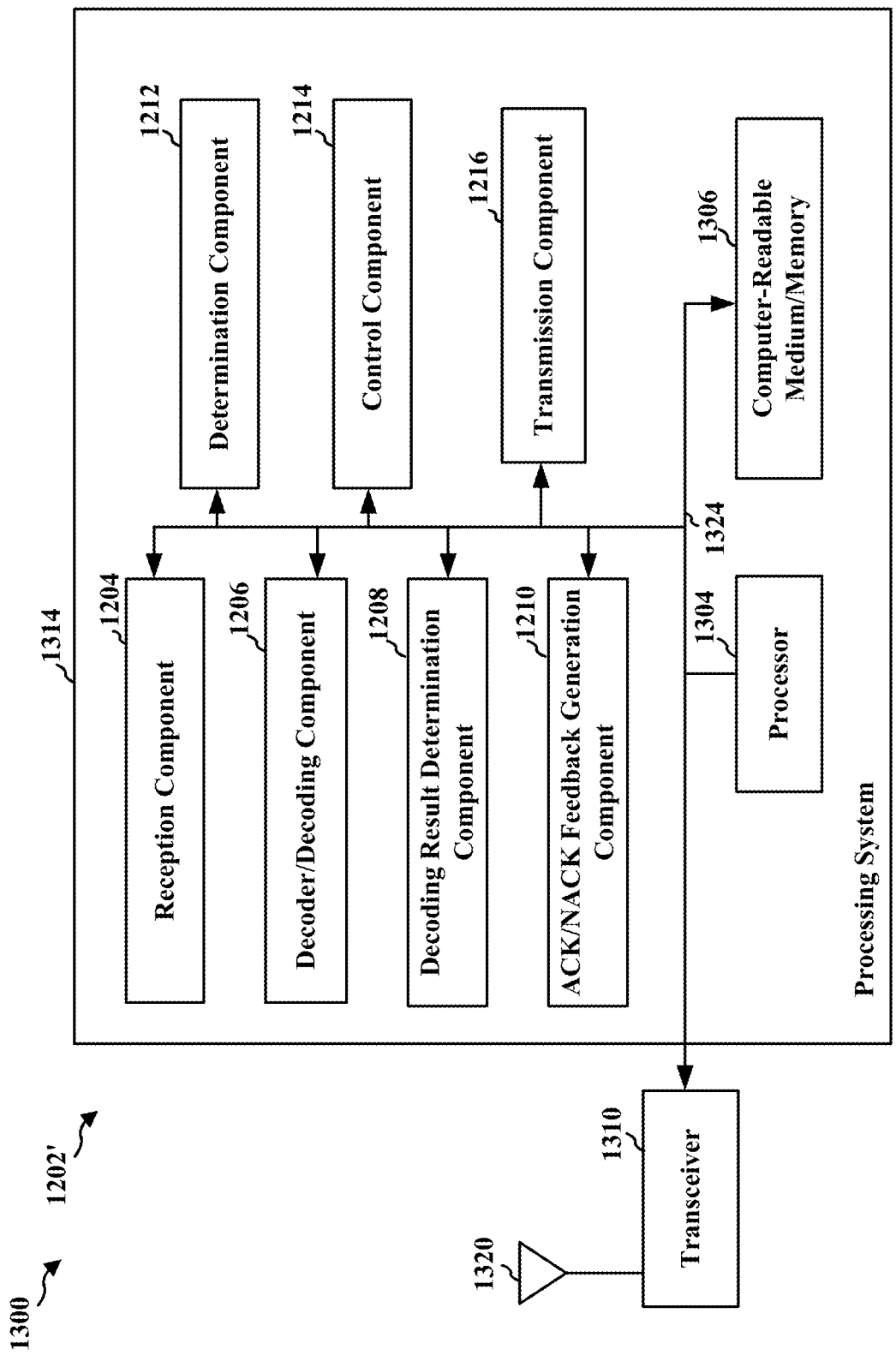
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1216, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216. The components may be software components running in the processor 1304, resident/stored in the computer-readable medium/memory 1306, one or more hardware components coupled to the processor 1304, or some combination thereof. The processing system 1314 may be a component of the UE 350 and may include the memory 360 and/or at least one of the TX processor 366, the RX processor 356, and the controller/processor 359.

In one configuration, the apparatus 1202/1202' for wireless communication may include means for determining that one or more CBGs of a set of CBGs received from a base station failed to be properly decoded at the UE. The apparatus 1202/1202' may further include means for sending, to the base station, ACK/NACK feedback indicating the one or more CBGs that failed to be properly decoded. The apparatus 1202/1202' may further include means for receiving, from the base station, a retransmission of CBGs of the set of CBGs in response to the ACK/NACK feedback, and information indicating retransmitted CBGs of the set of CBGs.

In some configurations, the retransmitted CBGs correspond to a first TB, and the retransmission of CBGs is received in a subframe. In some such configurations, the apparatus 1202/1202' may further include means for receiving new data corresponding to a second TB from the base station in the subframe. In some configurations, the first TB is associated with a first HARQ process and the second TB is associated with a second HARQ process different than the first HARQ process.

In some configurations, the apparatus 1202/1202' may further include means for determining whether the retransmission of CBGs include the one of more CBGs that failed to be properly decoded based on the information indicating the retransmitted CBGs of the set of CBGs. In some configurations, the means for sending ACK/NACK feedback may be configured to send another (e.g., a second) ACK/NACK feedback based on determining whether the retransmission of CBGs include the one of more CBGs that failed to be properly decoded.

In some configurations, the apparatus 1202/1202' may include means for determining that at least one retransmitted CBG of the first TB failed to be properly decoded, and for determining that the second TB has been successfully decoded. In some such configurations, the means for sending ACK/NACK feedback may be configured to send to the base station, a second ACK/NACK feedback, the second ACK/NACK feedback including a first CBG level ACK/NACK indicating the at least one retransmitted CBG that failed to be properly decoded, a TB level ACK indicating that the second TB has been successfully decoded, and an indicator indicating that the CBG level ACK/NACK corresponds to the first TB.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
 receiving, from a user equipment (UE), a first acknowledgement (ACK)/negative ACK (NACK) (ACK/NACK) feedback indicating that a subset of codeblock groups (CBGs) of a set of transmitted CBGs corresponding to a first transport block (TB) failed to be properly decoded;
 transmitting, based on the first ACK/NACK feedback, in a same resource allocation, a retransmission of the subset of CBGs corresponding to the first TB and a transmission of new data corresponding to a second TB;
 transmitting a downlink control information (DCI) message comprising information indicating the subset of CBGs that is being retransmitted, wherein the information comprises a CBG-level bitmap that explicitly indicates, in the DCI message, a CBG index for each of the subset of CBGs that is being retransmitted; and
 receiving, from the UE, a second ACK/NACK feedback indicating feedback for the first TB and the second TB that are associated with different hybrid automatic repeat request (HARQ) processes in the same resource allocation, the second ACK/NACK feedback comprising a CBG-level ACK/NACK indicating whether at least one retransmitted CBG corresponding to the first TB failed to be properly decoded and a TB-level ACK/NACK indicating whether the second TB is properly decoded and does not require retransmission.

2. The method of claim 1, wherein the subset of CBGs of the first TB and the new data of the second TB are transmitted in respective portions of a subframe.

3. The method of claim 2, wherein the subset of CBGs is retransmitted in a first mini-slot corresponding to a first set of symbols in the subframe, and at least a portion of the second TB is transmitted in a second mini-slot corresponding to a second set of symbols in the subframe.

4. The method of claim 2, wherein the first TB, comprising the subset of CBGs that are retransmitted, is associated with a first HARQ process and the second TB, comprising the new data, is associated with a second HARQ process different than the first HARQ process.

5. The method of claim 1, wherein the DCI message further indicates at least one of a slot boundary between the first TB corresponding to the subset of CBGs that is retransmitted and the second TB corresponding to the new data, or a modulation and coding scheme (MCS) associated with the new data.

6. The method of claim 1, wherein the first TB and the second TB are transmitted via a first multiple-input multiple-output (MIMO) transmission, the first TB and the second TB being associated with a first HARQ process, the first ACK/NACK feedback being received in response to the first MIMO transmission, and wherein the subset of CBGs is associated with the first HARQ process and is retransmitted via a second MIMO transmission in a subframe along with the new data corresponding to the second TB associated with a second HARQ process.

7. The method of claim 1, wherein a size of a CBG is configurable based on a size of a transport block to which the CBG corresponds.

8. The method of claim 1, wherein a number of codeblocks (CBs) in each CBG of the set of transmitted CBGs is different than a number CBs in each CBG of the subset of CBGs being retransmitted.

9. An apparatus for wireless communication, comprising:
 at least one processor coupled to a memory and configured to:
  receive, from a user equipment (UE), a first acknowledgement (ACK)/negative ACK (NACK) (ACK/NACK) feedback indicating that a subset of codeblock groups (CBGs) of a set of transmitted CBGs for a first transport block (TB) failed to be properly decoded;
  transmit, based on the first ACK/NACK feedback, in a same resource allocation, a retransmission of the subset of CBGs of the first TB and a transmission of new data of a second TB;
  transmit a downlink control information (DCI) message comprising information indicating the subset of CBGs that is being retransmitted, wherein the information comprises a CBG-level bitmap that explicitly indicates, in the DCI message, a CBG index for each of the subset of CBGs that is being retransmitted; and
  receive, from the UE, a second ACK/NACK feedback indicating feedback for the first TB and the second TB that are associated with different hybrid automatic repeat request (HARQ) processes in the same resource allocation, the second ACK/NACK feedback comprising a CBG-level ACK/NACK indicating whether at least one retransmitted CBG corresponding to the first TB failed to be properly decoded and a TB-level ACK/NACK indicating whether the second TB is properly decoded and does not require retransmission.

10. The apparatus of claim 9, wherein the retransmission of the subset of CBGs of the first TB and the transmission of the new data of the second TB are transmitted in a subframe within the same resource allocation.

11. The apparatus of claim 10, wherein the subset of CBGs is retransmitted in a first mini-slot corresponding to a first set of symbols in the subframe, and at least a portion of the second TB is transmitted in a second mini-slot corresponding to a second set of symbols in the subframe.

12. A method of wireless communication of a user equipment (UE), comprising:
 determining that one or more codeblock groups (CBGs) of a set of CBGs for a first transport block (TB) received from a base station failed to be properly decoded at the UE;
 sending, to the base station, a first acknowledgement (ACK)/negative ACK (NACK) (ACK/NACK) feedback indicating the one or more CBGs that failed to be properly decoded;

receiving, from the base station, a retransmission of CBGs of the set of CBGs of the first TB in response to the first ACK/NACK feedback and a transmission of new data of a second TB, and a downlink control information (DCI) message comprising information indicating retransmitted CBGs of the set of CBGs, wherein the information comprises a CBG-level bitmap that explicitly indicates, in the DCI message, a CBG index for each of the retransmitted CBGs; and sending, to the base station, a second ACK/NACK feedback indicating feedback for the first TB and the second TB that are associated with different hybrid automatic repeat request (HARQ) processes in a same resource allocation, the second ACK/NACK feedback comprising a CBG-level ACK/NACK indicating whether at least one retransmitted CBG corresponding to the first TB failed to be properly decoded and a TB-level ACK/NACK indicating whether the second TB is properly decoded and does not require retransmission.

13. The method of claim 12, wherein the retransmission of CBGs of the first TB and the transmission of the new data of the second TB are received in a subframe within the same resource allocation.

14. The method of claim 13, wherein the first TB, comprising the retransmitted CBGs, is associated with a first HARQ process and the second TB, comprising the new data, is associated with a second HARQ process different than the first HARQ process.

15. The method of claim 13, further comprising:
determining that the at least one retransmitted CBG of the first TB failed to be properly decoded; and
determining that the second TB has been successfully decoded, wherein the CBG-level ACK/NACK in the second ACK/NACK feedback indicates that the at least one retransmitted CBG failed to be properly decoded and the TB-level ACK/NACK indicates that the second TB has been successfully decoded and that the CBG-level ACK/NACK corresponds to the first TB.

16. The method of claim 12, wherein the DCI message further indicates at least one of a slot boundary between the first TB corresponding to the retransmitted CBGs of the set of CBGs and the second TB corresponding to the new data, or a modulation and coding scheme (MCS) associated with the new data.

17. The method of claim 12, further comprising:
determining whether the retransmission of CBGs include the one of more CBGs that failed to be properly decoded based on the information indicating the retransmitted CBGs of the set of CBGs, wherein the second ACK/NACK feedback is sent based on determining whether the retransmission of CBGs include the one or more CBGs that failed to be properly decoded.

18. An apparatus for wireless communication, comprising:
at least one processor coupled to a memory and configured to:
determine that one or more codeblock groups (CBGs) of a set of CBGs for a first transport block (TB) received from a base station failed to be properly decoded at a user equipment (UE);
send, to the base station, a first acknowledgement (ACK)/negative ACK (NACK) (ACK/NACK) feedback indicating the one or more CBGs that failed to be properly decoded;
receive, from the base station, a retransmission of CBGs of the set of CBGs of the first TB in response to the first ACK/NACK feedback and a transmission of new data of a second TB, and a downlink control information (DCI) message comprising information indicating retransmitted CBGs of the set of CBGs, wherein the information comprises a CBG-level bitmap that explicitly indicates, in the DCI message, a CBG index for each of the retransmitted CBGs; and
send, to the base station, a second ACK/NACK feedback indicating feedback for the first TB and the second TB that are associated with different hybrid automatic repeat request (HARQ) processes in a same resource allocation, the second ACK/NACK feedback comprising a CBG-level ACK/NACK indicating whether at least one retransmitted CBG corresponding to the first TB failed to be properly decoded and a TB-level ACK/NACK indicating whether the second TB is properly decoded and does not require retransmission.

19. The apparatus of claim 18, wherein the retransmission of CBGs of the first TB and the transmission of the new data of the second TB are received in a same subframe within the same resource allocation.

20. The apparatus of claim 19, wherein the at least one processor is further configured to:
determine that at least one retransmitted CBG of the first TB failed to be properly decoded; and
determine that the second TB has been successfully decoded, wherein the CBG-level ACK/NACK in the second ACK/NACK feedback indicates that the at least one retransmitted CBG failed to be properly decoded and the TB-level ACK/NACK indicates that the second TB has been successfully decoded and that the first CBG-level ACK/NACK corresponds to the first TB.

21. The apparatus of claim 18, wherein the DCI message further indicates at least one of a slot boundary between the first TB corresponding to the retransmitted CBGs of the set of CBGs and the second TB corresponding to the new data, or a modulation and coding scheme (MCS) associated with the new data.

22. The apparatus of claim 18, wherein the at least one processor is further configured to:
determine whether the retransmission of CBGs include the one of more CBGs that failed to be properly decoded based on the information indicating the retransmitted CBGs of the set of CBGs, wherein the second ACK/NACK feedback is sent based on determining whether the retransmission of CBGs include the one or more CBGs.

* * * * *